(12) United States Patent
Fabiano et al.

(10) Patent No.: US 6,955,370 B2
(45) Date of Patent: Oct. 18, 2005

(54) RETRACTABLE RUNNING BOARD

(75) Inventors: Tony Fabiano, Newmarket (CA); Joseph F. Scheuring, III, Newmarket (CA); Terry L. Reid, Alliston (CA); Larry Downs, Barrie (CA)

(73) Assignee: Ventra Group Inc., Bradford (CA)

( * ) Notice: Subject to any disclaimer, the term of this patent is extended or adjusted under 35 U.S.C. 154(b) by 45 days.

(21) Appl. No.: 10/341,432

(22) Filed: Jan. 14, 2003

(65) Prior Publication Data

US 2003/0132595 A1 Jul. 17, 2003

Related U.S. Application Data

(60) Provisional application No. 60/348,389, filed on Jan. 16, 2002.

(51) Int. Cl.[7] .................................................. B60R 3/02
(52) U.S. Cl. ....................................... 280/163; 280/166
(58) Field of Search ................................. 280/163, 166, 280/763.1; 182/96, 19

(56) References Cited

U.S. PATENT DOCUMENTS

| | | |
|---|---|---|
| 3,608,957 A | 9/1971 | Maneck |
| 3,756,164 A | 9/1973 | Miller et al. |
| 3,762,742 A * | 10/1973 | Bucklen ..................... 280/166 |
| 4,020,920 A | 5/1977 | Abbott |
| 4,021,055 A | 5/1977 | Okland |
| 4,116,457 A | 9/1978 | Nerem et al. |
| 4,167,272 A | 9/1979 | Wright et al. |
| 4,203,611 A | 5/1980 | Makela |
| 4,257,620 A | 3/1981 | Okland |
| 4,266,792 A | 5/1981 | Sanders et al. |
| 4,451,063 A | 5/1984 | Snyder |
| 4,456,275 A | 6/1984 | Snyder et al. |
| 4,679,810 A | 7/1987 | Kimball |
| 4,696,507 A | 9/1987 | Alldredge |
| 4,838,567 A | 6/1989 | Michanczyk |
| 4,934,721 A | 6/1990 | Flores |
| 5,382,035 A | 1/1995 | Waddington et al. |

(Continued)

FOREIGN PATENT DOCUMENTS

| | | |
|---|---|---|
| DE | 43 41 134 A1 | 6/1995 |
| WO | WO 00/50262 | 8/2000 |
| WO | WO 02/053416 A2 | 7/2002 |
| WO | WO 02/085670 A2 | 10/2002 |

OTHER PUBLICATIONS

"Power Lift Running," Research Disclosure, Kenneth Mason Publications, Hampshire, GB, No. 457, pp. 792–795 (2002), XP–001127346.

Primary Examiner—Christopher P Ellis
Assistant Examiner—Christopher Bottorff
(74) Attorney, Agent, or Firm—Pillsbury Winthrop Shaw Pittman LLP

(57) ABSTRACT

A retractable running board assembly is mounted to the frame of a vehicle. The running board is selectively extendable between a retracted position, which is close to the vehicle's frame, and a lower, laterally-outward extended position that facilitates easy entrance into and exit from the vehicle. A plurality of longitudinally spaced, selectively-actuated links connect the running board to the frame. A selectively-operable driving mechanism concertedly actuates each of the links to extend and retract the running board. When the driving mechanism is not operated, each link resists actuation and holds the running board in a fixed position relative to the frame.

26 Claims, 23 Drawing Sheets

U.S. PATENT DOCUMENTS

| | | | |
|---|---|---|---|
| 5,511,750 A | 4/1996 | Evenson | |
| 5,538,269 A | 7/1996 | McDaniel et al. | |
| 5,697,626 A | 12/1997 | McDaniel et al. | |
| 5,806,869 A | 9/1998 | Richards | |
| 5,842,709 A * | 12/1998 | Maccabee | 280/166 |
| 5,895,064 A | 4/1999 | Laubach | |
| 5,944,332 A | 8/1999 | Lee et al. | |
| 6,135,472 A | 10/2000 | Wilson et al. | |
| 6,141,997 A * | 11/2000 | Blehi, III | 70/56 |
| 6,168,176 B1 | 1/2001 | Mueller | |
| 6,170,842 B1 | 1/2001 | Mueller | |
| 6,173,979 B1 | 1/2001 | Bernard | |
| 6,203,040 B1 | 3/2001 | Hutchins | |
| 6,267,398 B1 | 7/2001 | Lombard | |
| 6,375,207 B1 | 4/2002 | Dean et al. | |
| 6,641,158 B2 * | 11/2003 | Leitner | 280/166 |

* cited by examiner

RETRACTABLE RUNNING BOARD

CROSS-REFERENCE TO RELATED APPLICATIONS

This application claims the benefit of priority to U.S. Provisional Patent Application No. 60/348,389 titled "Retractable Running Board," filed on Jan. 16, 2002, which is incorporated herein by reference.

BACKGROUND OF THE INVENTION

1. Field of the Invention

The present invention relates to retractable running boards for vehicles.

2. Description of Related Art

Most conventional vehicle running boards have fixed positions relative to the frames of the vehicles that they are attached to.

Designers of fixed-position running board vehicles must balance ground clearance against the desire to place running boards in a lower, more passenger convenient position midway between ground level and the lower edge of the vehicle door opening. In a vehicle such as a truck, in which a large ground clearance is advantageous, the cab and passenger seats are typically disposed well above ground level. Consequently, conventional running boards provide an intermediate step for passengers to use to enter and exit the vehicle. From the standpoint of facilitating a passenger's entrance and exit from the vehicle, the most convenient height for a running board is generally at about half the distance between the ground level and the lower edge of the vehicle door opening. However, disposing the running board at such a low position reduces the vehicle's ground clearance. Consequently, designers must sacrifice either convenience or ground clearance when determining the height of a fixed-position running board.

Conventional retractable running boards, such as the running board disclosed in U.S. Pat. No. 5,697,626, include running boards with selectively variable heights. When the vehicle is being driven, the running board is raised vertically to improve the vehicle's ground clearance. Conversely, when the vehicle is stopped, the running board can be lowered to position the running board at a more convenient height for the passengers.

Vehicle designers face an additional dilemma when determining the lateral position of fixed-position running boards. To provide the most convenience to passengers entering or exiting a vehicle, the running board should be disposed laterally outwardly from the vehicle's entrances/doors such that the lower edge of the door opening, the running board, and the ground form laterally- and vertically-spaced steps like those in building stairways. Unfortunately, disposing a running board fixed laterally outwardly from the vehicle for the passengers' convenience disadvantageously increases the vehicle's width.

Conventional retractable running boards, such as the running board disclosed in U.S. Pat. No. 3,608,957, have been designed to extend laterally outwardly when the vehicle's door is opened such that the running board is in a convenient laterally-outward position when the passengers need to use it to enter and exit the vehicle. Conversely, the running board is retracted laterally inwardly when the door is closed so that the vehicle has a narrower width during operation.

The Applicants are aware of a retractable running board developed by Amp Research of Irvine, Calif. that moves both laterally and vertically between its extended and retracted positions; however, they have not had an opportunity to examine that device, nor are they aware of any patents disclosing that device. The Applicants believe that two longitudinally spaced four-bar linkages connect the running board to the vehicle, and that an automatic actuator powers only one of the two linkages to extend the running board downwardly and outwardly when the vehicle's passenger door is opened. The second four-bar linkage is believed to move freely and therefore follows the movements of the first powered linkage as the powered movement of the first linkage is transferred through the length of the running board to the second linkage. Because the second linkage is not, itself, powered and cannot resist movement of the running board, the running board cannot be firmly held in place, especially when the weight of a passenger is exerted on the running board at a position far from the first powered linkage.

The statements made herein with respect to the Amp Research device are only made for the purposes of disclosing potentially relevant information to the Examiner. As the Amp Research device was only seen at a tradeshow prior to the effective filing date of this application by an employee of the assignee and could not be closely examined, Applicants believe that the device functions as stated above and for the purposes of examining the present application, the Examiner may consider this to be the case. However, Applicants reserve the right to dispute these issues in the event further information becomes available.

SUMMARY OF THE INVENTION

One aspect of the present invention provides a retractable running board assembly for use with a vehicle having a passenger compartment and an opening for permitting a person to enter and exit the passenger compartment. The retractable running board assembly includes an anchor constructed and arranged to mount the running board assembly to the vehicle in an operative position beneath the passenger compartment. The retractable running board assembly also includes a elongated retractable running board and a running board moving assembly. The running board moving assembly includes at least first and second selectively-actuated links connected to the anchor and movably supporting the running board at longitudinally spaced apart positions. The links are constructed and arranged such that, when the running board assembly is mounted in the operative position, concerted actuation of each of the selectively-actuated links moves the running board between (a) an extended position wherein the running board is extended outwardly from the vehicle away from the door opening at an elevation lower than the door opening and spaced above ground level for facilitating entry into the passenger compartment via the door opening and (b) a retracted position wherein the running board is retracted inwardly and raised upwardly from the extended position. The running board moving assembly further includes a selectively-operable driving mechanism operatively connected to each of the first and second selectively-actuated links such that, when the running board assembly is mounted in the operative position, selective operation of the driving mechanism concertedly actuates each of the selectively-actuated links to move the running board between the retracted and extended positions.

The running board moving assembly may further include an elongated torque transmitting member operatively connecting each of the second legs of the first and second selectively-actuated links to the selectively-operable driving mechanism to transmit torque from the selectively-operable driving mechanism to pivot the second legs about a longitudinal axis, thus causing the links to move the running board between the extended and retracted positions.

The running board moving assembly may include a backdrive-prevention mechanism operatively connected between the selectively-operable driving mechanism and the selectively-actuated links.

A further aspect of the present invention provides a retractable running board assembly for use with a vehicle having a passenger compartment and a door opening for permitting a person to enter and exit the passenger compartment. The retractable running board assembly includes an anchor constructed and arranged to mount the running board assembly to the vehicle in an operative position beneath the door opening. The retractable running board assembly also includes a elongated retractable running board having a non-circular cross-section perpendicular to a longitudinal direction thereof, and a running board moving assembly. The running board moving assembly includes at least one link connected between the running board and the anchor and movably supporting the running board. The link is constructed and arranged such that, when the running board assembly is mounted to the vehicle in the operative position, actuation of the link moves the running board between (a) an extended position wherein the running board extends outwardly from the vehicle away from the door opening at an elevation lower than the door opening and spaced above ground level for facilitating entry into the passenger compartment via the door opening and (b) a retracted position wherein the running board is retracted inwardly and raised upwardly from the extended position, the link enabling the running board to maintain essentially the same orientation during movement between the extended and retracted positions. The running board moving assembly further includes a selectively-operable driving mechanism operatively connected to the link such that, when the running board assembly is mounted in the operative position, selective operation of the driving mechanism actuates the link to move the running board between the retracted and extended positions.

This feature is considered advantageous in the context of using a running board of non-circular cross-section, such as one with a flat step surface or one with an ovular cross-section. With a board of circular cross-section, its orientation is not material, as it will provide the same configuration for stepping thereupon irrespective of its orientation. However, with a board of non-circular cross-section, maintaining its orientation the same between its extended and retracted positions, and any other positions, is advantageous. Specifically, even when the board is fully retracted, persons may still step on it and it is desirable to keep it properly oriented for this reason. Also, if the board has multiple extended positions, it is desirable to maintain the same orientations between positions.

A further aspect of the present invention provides a vehicle including a passenger compartment having a door opening for permitting a person to enter and exit the passenger compartment. The vehicle includes a panel having a first outer lateral surface. The vehicle also includes a retractable running board assembly mounted to the vehicle in an operative position beneath the door opening. The retractable running board assembly includes a elongated retractable running board selectively movable between an extended and a retracted position, and a selectively-operable driving mechanism operatively connected to the running board to move the running board between the extended and retracted positions. The running board has a second outer lateral surface positioned such that when the retractable running board is in the retracted position, the first and second outer lateral surfaces form an essentially continuous surface at their intersection.

A further aspect of the present invention provides a retractable running board assembly for use with a vehicle having a passenger compartment and a door opening for permitting a person to enter and exit the passenger compartment. The assembly includes an anchor constructed and arranged to mount the running board assembly to the vehicle in an operative position beneath the door opening, an elongated retractable running board, and a running board moving assembly. The running board moving assembly includes at least one selectively-actuated link connected between the running board and the anchor and movably supporting the running board. The link is constructed and arranged such that, when the running board assembly is mounted to the vehicle in the operative position, actuation of the link moves the running board between (a) a retracted position, (b) a primary extended position wherein the running board is moved at least outwardly with respect to the vehicle from the retracted position for facilitating passenger entry into the passenger compartment via the door opening, and (c) a secondary extended position wherein the running board is moved upwardly from the primary extended position for facilitating passenger access to a roof of the vehicle. A selectively-operable driving mechanism is operatively connected to the link such that, when the running board assembly is mounted in the operative position, selective operation of the driving mechanism actuates the link to move running board between the retracted, primary extended, and secondary extended positions.

Additional and/or alternative aspects, objects, features, and advantages of the present invention will become apparent from the following description, the accompanying drawings, and the appended claims.

BRIEF DESCRIPTION OF THE DRAWINGS

For a better understanding of the present invention as well as other objects and further features thereof, reference is made to the following description which is to be used in conjunction with the accompanying drawings, where.

DETAILED DESCRIPTION OF PREFERRED EMBODIMENTS OF THE INVENTION

Figure 1:
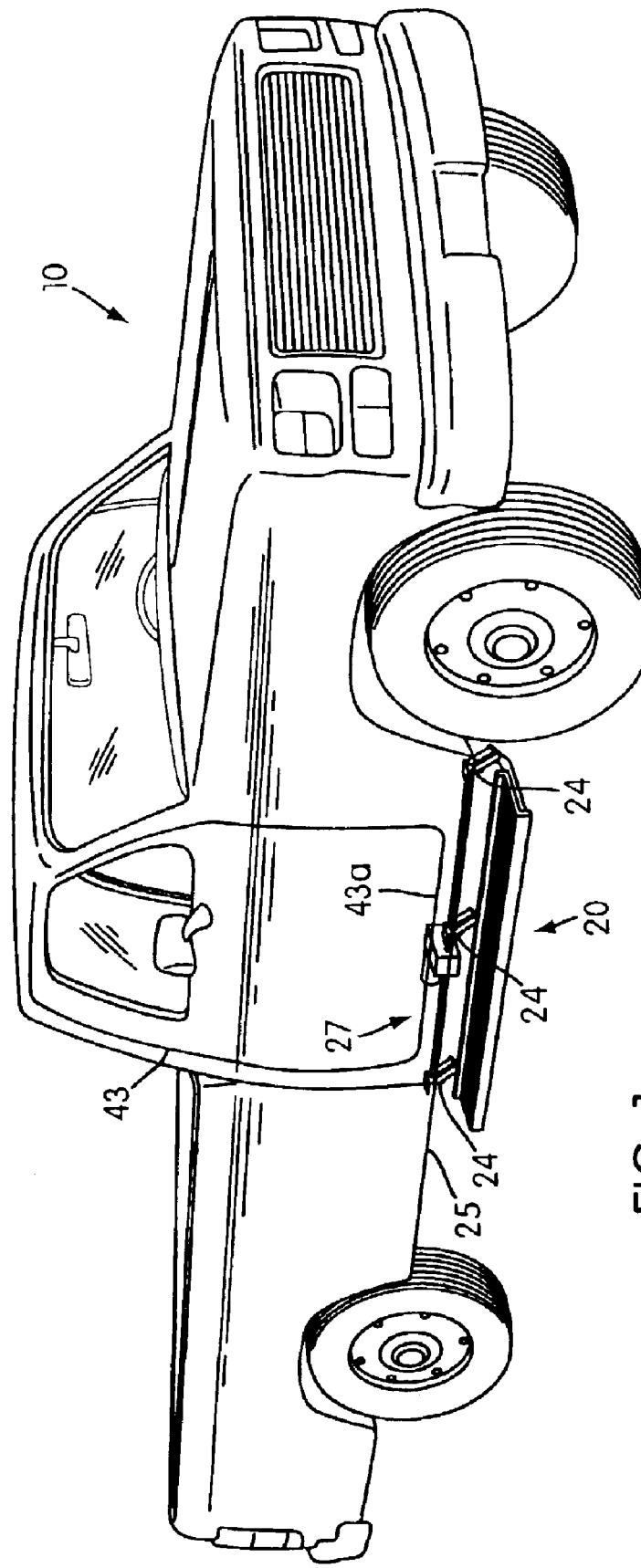
FIG. 1 is a perspective view of a truck with a retractable running board according to the present invention with the running board in an extended position.

FIG. 1 illustrates a vehicle 10 that has a retractable running board assembly 20 according to a preferred embodiment of the present invention. The retractable running board assembly 20 includes an anchor 24 mounted to a frame (or body) 25 of the vehicle 10 in an operative position below a passenger compartment of the vehicle 10. The vehicle 10 has a longitudinal direction that is defined by direction of movement of the vehicle 10. While the running board assembly 20 in this embodiment is disposed along the passenger side of the vehicle 10, the running board assembly 20 may alternatively be disposed along a variety of other portions of the vehicle 10 such as the driver's side, the front, or the back. Further, the retractable running board assembly 20 according to the present invention may also be utilized in other types of vehicles, such as construction equipment, sport utility vehicles, etc.

While the anchor 24 and the frame 25 are illustrated as distinct elements in this embodiment, the anchor may be an integral part of the frame/body without departing from the scope of the present invention. The term anchor is a structural term used herein to encompass any structure mounting the assembly 20 to the vehicle 10.

Figure 2:
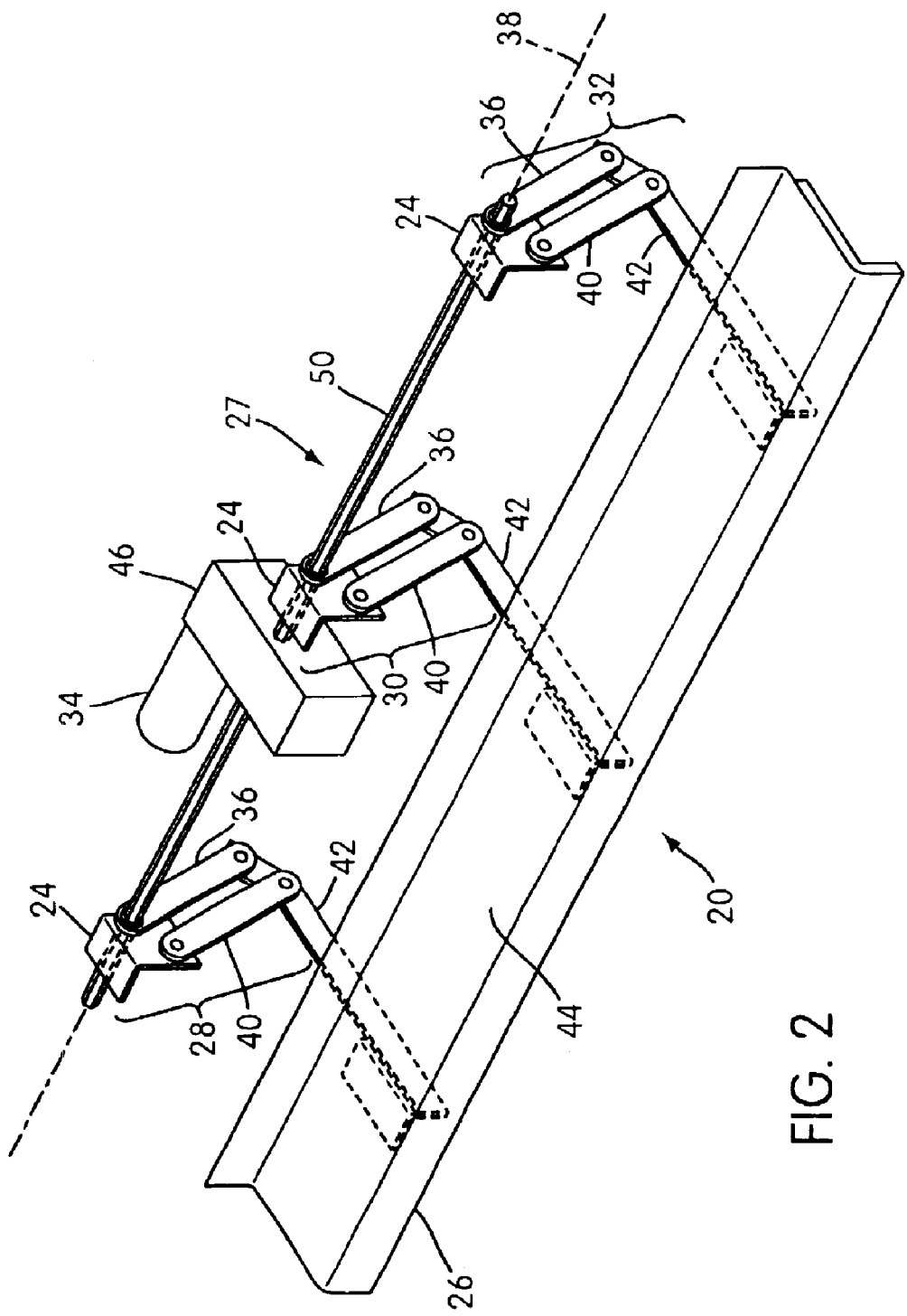
FIG. 2 is a partial perspective view thereof with the running board in the extended position.

FIG. 2 is an enlarged perspective view of the retractable running board assembly 20. A longitudinally elongated retractable running board 26 is connected to the anchor 24 via a running board moving assembly 27. The board 26 is preferably, but not necessarily, of a non-circular cross-section perpendicular to its longitudinal direction. As illustrated, it is somewhat Z-shaped in cross-section. The running board moving assembly 27 includes a plurality of longitudinally spaced selectively-actuated links 28, 30, 32.

In this embodiment, the longitudinal direction of the running board 26 is generally parallel to a longitudinal direction of the vehicle 10. However, if the running board assembly 20 were disposed on the vehicle 10 in a position other than along the lateral sides, the running board 26 would not parallel the longitudinal direction of the vehicle 10.

Figure 3:
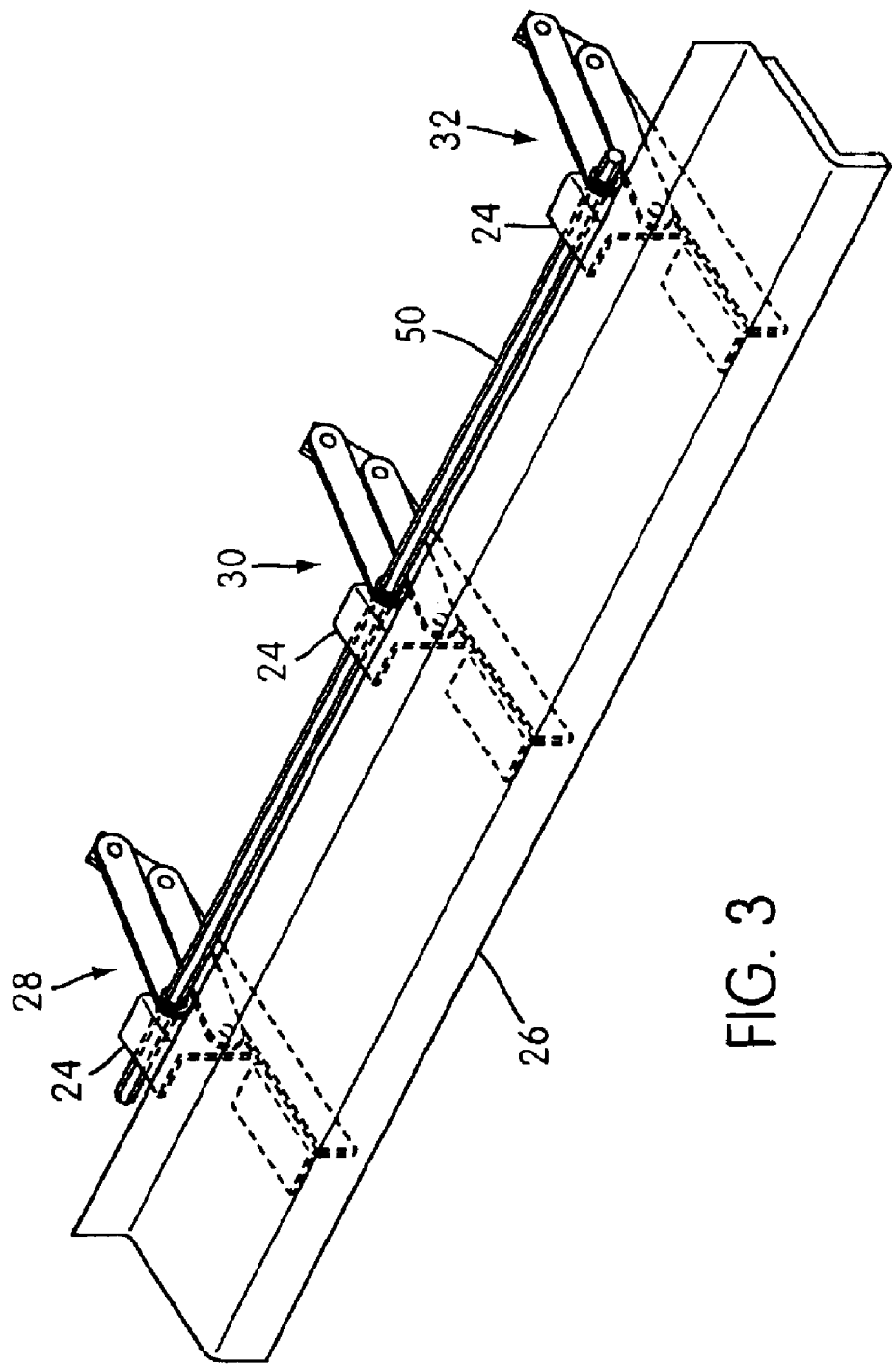
FIG. 3 is a partial perspective view thereof with the running board in a retracted position.

The running board moving assembly also includes a selectively-operable driving mechanism that is operatively connected to each of the plurality of selectively-actuated links 28, 30, 32 such that selective operation of the selectively-operable driving mechanism concertedly actuates each of the selectively-actuated links 28, 30, 32 and moves the running board 26 between an extended position (as shown in FIGS. 1 and 2) and a retracted position (as shown in FIG. 3). The driving mechanism may be of any type, including a D.C. reversible electric motor, a fluid driven motor, or a manually operated input, such as a lever, a crank, a wheel, or a rotatable lug.

As best illustrated in FIG. 2, each of the links 28, 30, 32 comprises a four-bar mechanism. A first leg of the four-bar mechanism is defined by the anchor 24. A second leg 36 connects to the first leg/anchor 24 for pivotal movement about a longitudinal axis 38 relative to the first leg/anchor 24. The longitudinal axis 38 is generally parallel to the longitudinal direction of the running board 26. A third leg 40 also pivotally connects to the first leg/anchor 24. A fourth leg 42 pivotally connects to the second and third legs 36, 40 and is mounted to the running board 26. The fourth leg 42 is preferably elongated so as to provide structural support to the running board 26.

Actuation of the links 28, 30, 32 translationally moves the running board 26 along a generally arcuate or curved path that is generally perpendicular to the longitudinal axis 38. Depending on the relative lengths of the legs 24, 36, 40, 42, the motion of the running board 26 may also include a rotational component. In this embodiment, however, each four-bar mechanism comprises a parallelogram such that the path of the running board 26 has no rotational component and the running board 26 is always generally level. The running board 26 therefore moves downwardly and outwardly relative to the vehicle 10 and anchor 24 as it moves from its retracted position to its extended position. When in the extended position, the running board 26 is preferably disposed (a) at a height generally midway between ground level and a lower edge 43a of an adjoining door opening 43 of the vehicle 10, and (b) at a lateral position that is disposed at least partially outward from a side of the vehicle 10 in order to facilitate easy entrance into and exit from the vehicle 10. When the vehicle 10 is on level ground with the running board 26 in the extended position, the running board assembly 20 does not touch the ground.

While in this embodiment, the extended and retracted positions of the running board 26 are both vertically and horizontally offset from each other, the present invention should not be understood to be so limited. Rather, except where extension and retraction are expressly limited to including both horizontal and vertical components, the path of the running board may comprise one or more of horizontal movement, vertical movement, and rotational components.

The four-bar mechanisms used as the links 28, 30, 32 are designed such that a stepping platform 44 defined by a top surface of the running board 26 is generally level when the running board 26 is in the extended position. The links 28, 30, 32 are further preferably designed to hold the running board 26 as close to the vehicle 10 as possible when the running board 26 is in the retracted position.

The running board moving assembly 27 further includes a longitudinally elongated torque transmitting member 50 that is mounted to each of the second legs 36 of the links 28, 30, 32 for common rotation with the second legs 36 about the longitudinal axis 38, which is preferably generally parallel to the longitudinal direction of the running board 26. The torque transmitting member 50 may be rotationally coupled to each of the second legs 36 using any of a variety of methods that would be understood by one skilled in the art. For example, the torque transmitting member 50 may have a square cross-section that fits into square holes in the second legs 36. Alternatively, a spline and keyway may be used to rotationally couple the torque transmitting member 50 to each of the second legs 36. The torque transmitting member 50 could also be welded to or formed integrally with the second legs 36.

The torque transmitting member 50 is operatively connected to the motor 34 via a gear box 46. In this embodiment, the gearbox 46 operates as a step-down mechanism such that the torque transmitting member 50 rotates substantially slower than the motor 34. The gear box 46 preferably includes a worm gear operatively connected to the motor 34 and a worm wheel operatively connected to the torque transmitting member 50. The worm gear and wheel serve dual functions by stepping down the speed of the motor 34 (and stepping up the torque) and locking the torque transmitting member 50 and gear box 46 into fixed rotational positions when the motor 34 is not being operated. As one of ordinary skill in the art would readily appreciate, the meshing of the worm gear prevent and wheel prevent a rotational force acting upon the worm wheel from rotating the worm gear (i.e., backdrive). Consequently, when the motor 34 is not being operated, the torque transmitting member 50, links 28, 30, 32, and running board 26 are locked into fixed positions, and hence the worm wheel and worm gear may be considered a backdrive prevention mechanism. Because each of the links 28, 30, 32 individually locks in place, the running board 26 is substantially immovable relative to the anchor 24 even when the weight of a passenger is exerted on a longitudinal end of the running board 26.

The selectively-operable motor 34 is an electric motor that is operated with a conventional electrical control circuit. If the control circuit is automatically controlled, the circuit could selectively operate the motor 34 to extend the running board into its extended position when the vehicle 10 is placed in park, when the doors are opened, when the ignition is turned off, etc. Alternatively, if the control circuit is manually controlled, an operation switch could be placed within the cab of the truck to allow an operator to selectively control the extension position of the running board 26.

While the illustrated motor 34 is an electric rotational motor, a motor according to the present invention could comprise a variety of other types of motors. For example, the motor 34 could be a linear motor, a hydraulic motor, a hydraulic cylinder, a linear actuator, etc.

Figure 4:
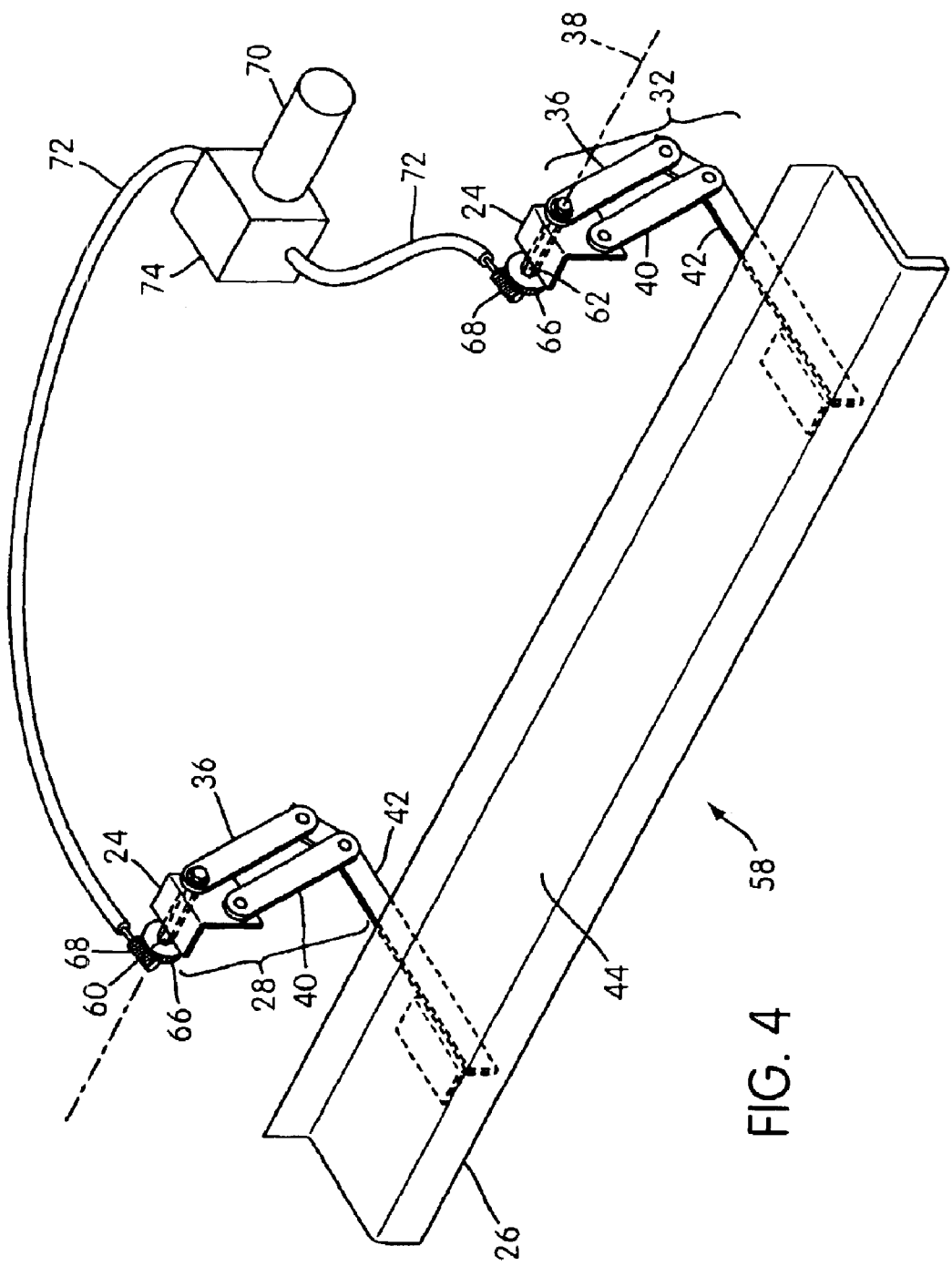
FIG. 4 is a partial perspective view of an alternative embodiment of the present invention.

FIG. 4 illustrates an alternative embodiment of a retractable running board assembly 58 of the present invention, which is generally similar to the previous embodiment. Where identical elements are utilized, identical reference numbers are used. In this embodiment, only two selectively-actuated links 28, 32 are used. Further, instead of using a single torque transmitting member as in the previous embodiment, two short torque transmitting members 60, 62 are rotationally coupled to the second legs 36 of the links 28, 32, respectively. Worm wheels 66 are rotationally coupled to each of the torque transmitting members 60, 62. Worm gears 68 mesh with each of the worm wheels 66. Each of the worm gears 68 is operatively connected to a motor 70 via a flexible torque transmitting cable 72 and a gear box 74. The flexible torque transmitting cable 72 preferably comprises a rotating inner cable mounted within an outer sheath. Each inner cable is operatively connected to a worm gear 68 and the gear box 74 in a conventional manner. As in the previous embodiment, the worm gears 68 and wheels 66 prevent the links 28, 32 from moving when the motor 70 is not being operated. When the motor 70 is operated, the links are concertedly actuated to extend and retract the running board 26. Because flexible torque transmitting cables 70 connect the motor 70 to the links 28, 32 (as opposed to the rigid connection of the previous embodiment), the motor 70 may be mounted in any convenient position on the vehicle 10.

Figure 5:
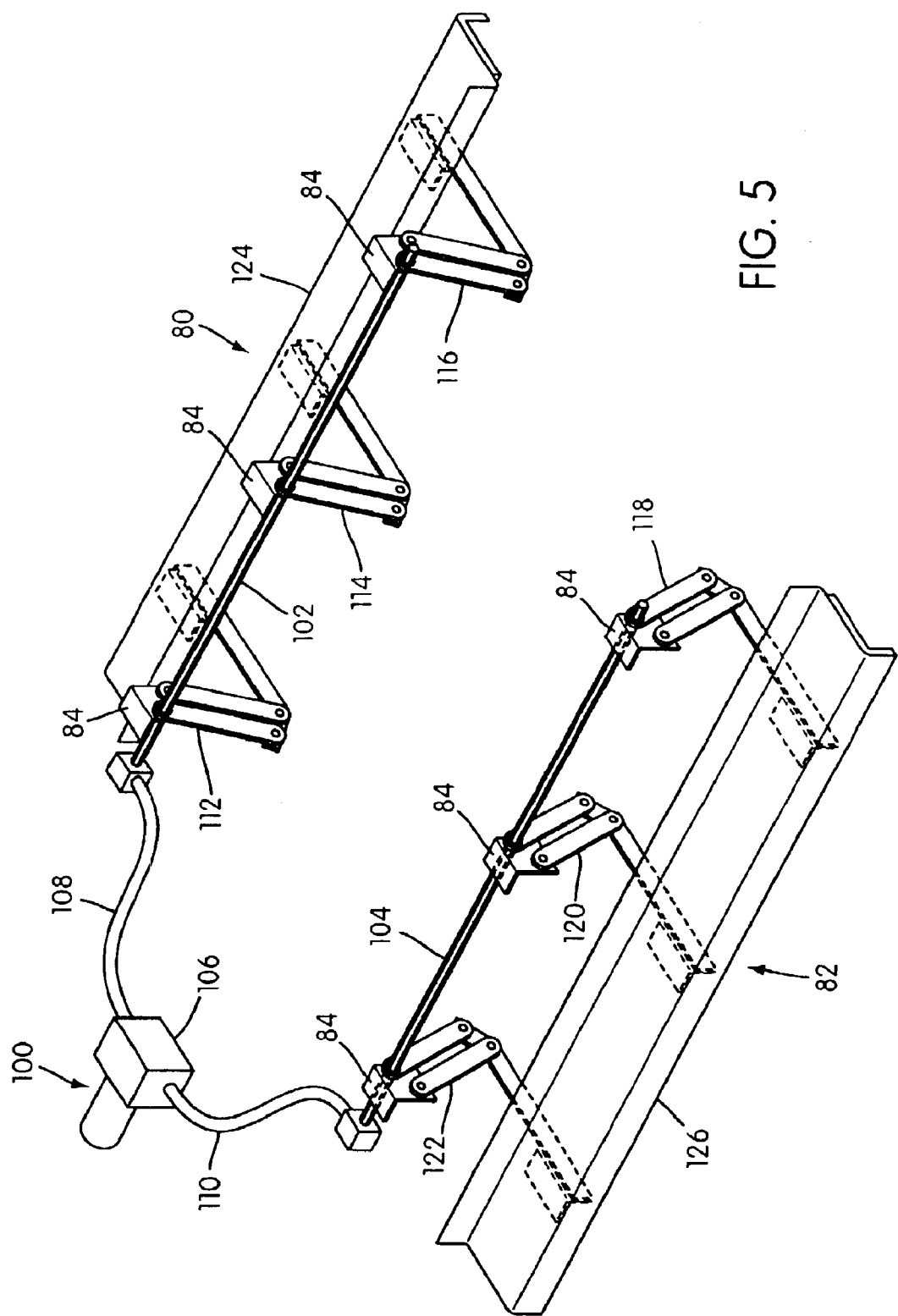
FIG. 5 is a partial perspective view of an additional alternative embodiment of the present invention.

FIG. 5 is a perspective view of an additional alternative embodiment of the present invention, which is generally similar to the embodiment illustrated in FIGS. 1–3. Two retractable running board assemblies 80, 82, which are generally similar to the running board assembly 20 illustrated in FIGS. 1–3, are provided. The running board assembly 80 is preferably mounted to a vehicle below passenger doors on one lateral side of the vehicle while the running board assembly 82 is preferably mounted below passenger doors on an opposite lateral side of the vehicle. Consequently, retractable running boards 124, 126 are provided at the passenger compartment openings on both lateral sides of the vehicle.

The anchor 84 of the running board assemblies 80, 82 is preferably mounted to the left and right sides of a vehicle such as the vehicle 10 below the passenger doors located on either lateral side of the vehicle 10. As in the previous embodiments, the anchor 84 may comprise a plurality of independent portions or a single integral piece. In this embodiment, the anchor 84 comprises a plurality of independent pieces that are each constructed and arranged to be mounted to a vehicle such as the vehicle 10 illustrated in FIG. 1.

Unlike the embodiment illustrated in FIGS. 1–3, however, the motor 100 is not directly geared to the longitudinally elongated torque transmitting members 102, 104. Instead, the motor 100 is operatively connected to a gearbox 106, which, in turn, is operatively connected to flexible torque transmitting cables 108, 110. The flexible torque transmitting cables 108, 110 are operatively connected to the torque tubes 102, 104, respectively (preferably via worm gears and wheels as in the previous embodiments). The torque transmitting members 102, 104, are each connected to a plurality of selectively-actuated links 112, 114, 116 and 118, 120, 122, respectively, which are generally identical to the links 28, 30, 32 of the embodiment illustrated in FIGS. 1–3. Running boards 124, 126 are operatively connected to the links 112, 114, 116 and 118, 120, 122, respectively. Like the motor 70 of the previous embodiment, the motor 100 of the present embodiment may be disposed at any convenient position on a vehicle.

This embodiment may also include just one running board assembly 102 without departing from the scope of the present invention.

Figure 6:
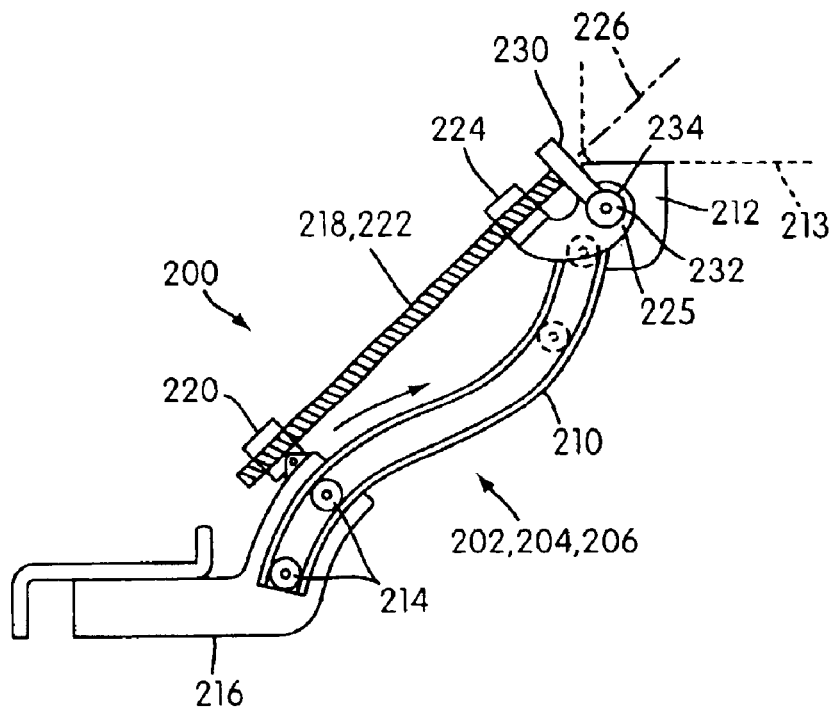
FIG. 6 is a front view of a further alternative embodiment of the present invention.

FIG. 6 illustrates an additional alternative embodiment of a retractable running board assembly 200 according to the present invention. The running board assembly 200 is generally similar to the running board assembly 20 except that the selectively-actuated links 202, 204, 206 comprise cam slides and linear actuators instead of four-bar mechanisms.

Each of the links 202, 204, 206 comprises a cam track 210 rigidly mounted to an anchor 212, which is, in turn, rigidly mounted to a frame 213 of a vehicle. A plurality of cam sliders 214 are mounted to a longitudinally elongated running board 216, which also has a non-circular cross-section, and are supported by the cam track 210 so as to allow the cam sliders 214 to move freely along the track 210 between an extended position (as shown in FIG. 6) and a retracted position (position in which cam sliders 214 are shown in phantom in FIG. 6). At each link 202, 204, 206, a conventional lead-screw linear actuator 218 connects the anchor 212 to the running board 216. The linear actuator 218 preferably includes a threaded nut 220 pivotally mounted to the running board 216. A lead screw 222 is threaded into the nut 220. A base 224 of the linear actuator 218 is pivotally connected to the anchor 212 for relative rotation therebetween about a longitudinal axis 225. The base 224 supports the lead screw 222 so as to prevent relative movement (e.g., backdrive) between the lead screw 222 and the base 224 along a lead screw axis 226 while allowing relative rotation between the lead screw 222 and the base 224 about the lead screw axis 226. A worm wheel 230 is mounted to the lead screw 222 for common rotation about the lead screw axis 226.

A longitudinally elongated torque transmitting member 232, which is generally identical to the torque transmitting member 50 of the running board assembly 20, is mounted for rotation relative to the anchor 212 about the longitudinal axis 225. A motor like the motor is operatively connected to the torque transmitting member 225 in the same fashion as the motor 34 is connected to the torque transmitting member 50 in the running board assembly 20 illustrated in FIGS. 1–3. At each link 202, 204, 206, a worm gear 234 is mounted onto the torque transmitting member 232 for common rotation therewith about the longitudinal axis 225. The worm gear 234 meshes with the worm wheel 230 such that rotation of the torque transmitting member 232 actuates the lead screw actuator 218 to extend or retract the running board 216 along the cam slide 210 with the running board 216 maintaining essentially the same orientation between its extended and retracted positions.

The torque transmitting member 232 may have a rotational displacement that is greater than or less than 360 degrees. The term, rotation, is therefore intended to encompass angular displacements greater than or less than 360 degrees. In this embodiment, the rotational displacement of the torque transmitting member is preferably greater than 360 degrees. However, in the previous embodiments that include four-bar mechanisms, the rotational displacements of the torque transmitting members 50, 60, 62, 102, 104 are preferably less than 360 degrees.

As would be appreciated by one skilled in the art, instead of mounting the cam track 210 to the anchor and the cam sliders 214 to the running board 216, the cam track 210 could be conversely rigidly mounted to the running board 216 and the cam sliders 214 could be mounted to the anchor.

Figure 7:
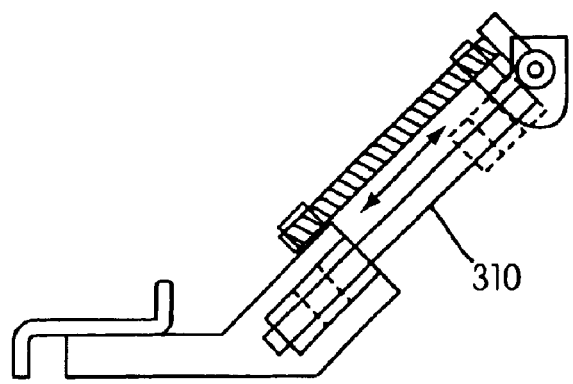
FIG. 7 is a front view of a further alternative embodiment of the present invention.

While in the embodiment illustrated in FIG. 6, the cam track 210 forms a slight "S" shape, the cam track 210 could also be shaped in a variety of other ways. For example, FIG. 7 illustrates an additional alternative embodiment, which is generally similar to the previous embodiment, except that the cam track 310 is linear.

Figure 8A:
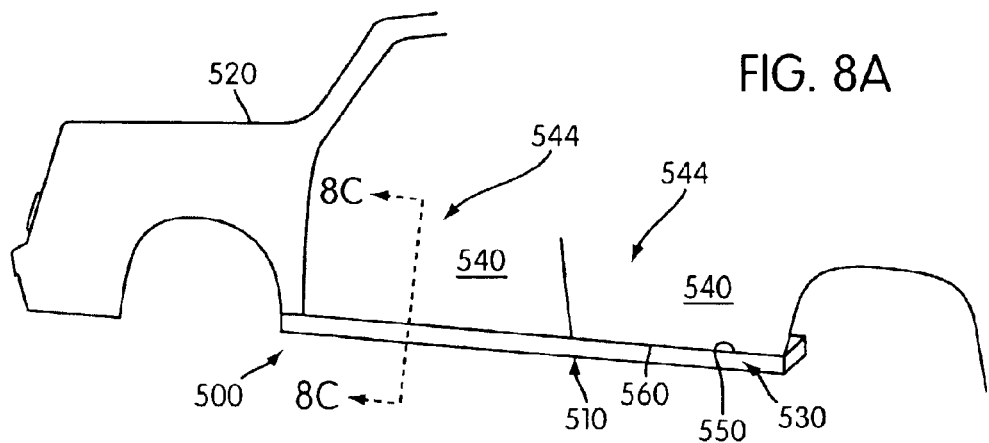
FIGS. 8A and 8B are partial perspective views of a further alternative embodiment of the present invention.
Figure 8B:
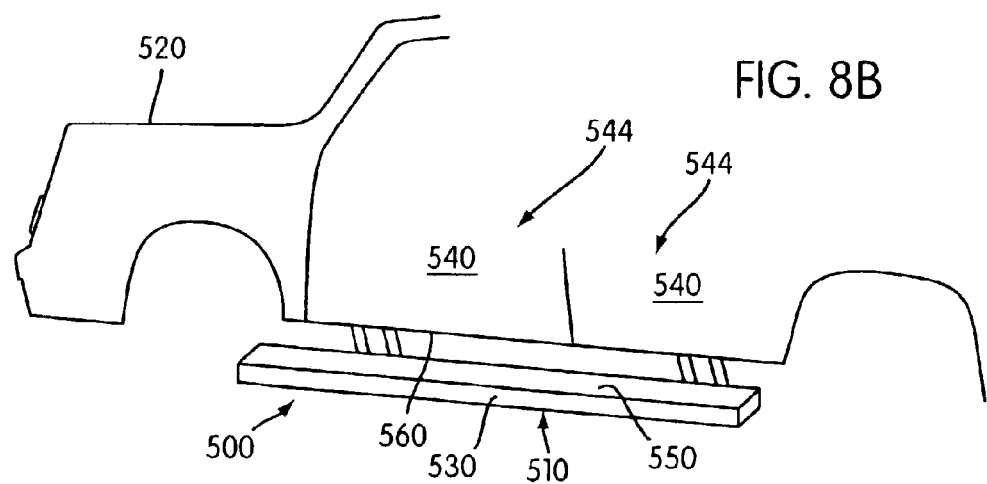
Figure 8C:
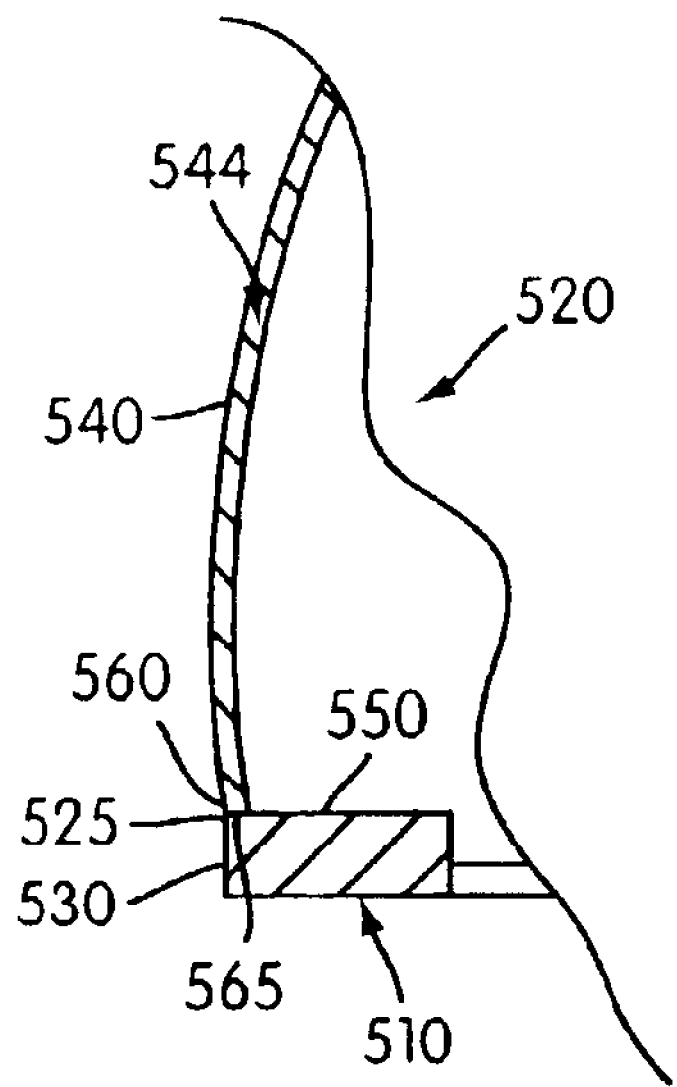
FIG. 8C is a partial sectional view of the embodiment illustrated in FIGS. 8A and 8B, taken along the line 8C—8C in FIG. 8A.

FIGS. 8A–8C illustrate an additional embodiment of a retractable running board assembly 500 of the present invention, which is generally identical to the retractable running board assembly 58 illustrated in FIG. 4 and discussed above. Accordingly, a redundant description of the mechanical principles is not provided. However, the retractable running board assembly 500 differs from the retractable running board assembly 58 in the following respects.

As illustrated in FIGS. 8A and 8C, the retractable running board assembly 500 includes a running board 510 that replaces/defines the sill of the vehicle 520. When the retractable running board assembly 500 is in the retracted position (as illustrated in FIGS. 8A and 8C), an upper edge 525 of an outer lateral surface 530 of the running board 510 abuts a lower edge 560 of an outer lateral surface 540 of a side panel 544 of the vehicle 520. When the retractable running board 500 is in the retracted position, the surfaces 530, 540 preferably generally form an aesthetically-appealing, smooth, essentially continuous surface at their intersection. The surfaces 530, 540 still form an essentially continuous surface even if small gaps and/or minor imperfections exist between the surfaces 530, 540. Alternatively, the surfaces 530, 540 may have different angles such that a vertex is formed at the intersection between the surfaces 530, 540.

As illustrated in FIG. 8C, when the retractable running board 510 is in the retracted position, an upper surface 550 of the retractable running board 510 abuts a lower surface 565 of the side panel 544. As illustrated in FIG. 8B, when the retractable running board assembly 500 is extended, the retractable running board assembly 500 functions in the same manner and is positioned in the same general location as the retractable running board assembly 58. The other illustrated retractable running board assemblies may also be modified in a similar manner to replace the sill of the vehicle.

Figure 9B:
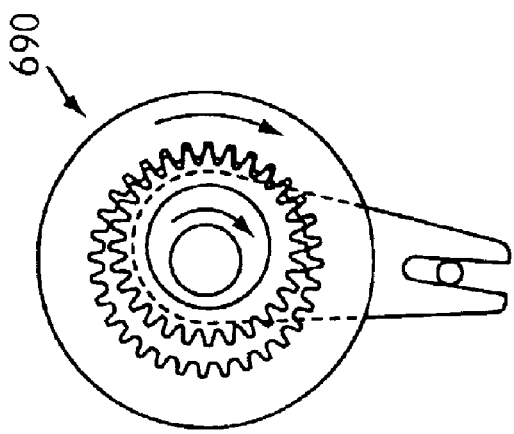
FIGS. 9A and 9B are side views of planetary gear drives that may be used in the present invention.
Figure 9A:
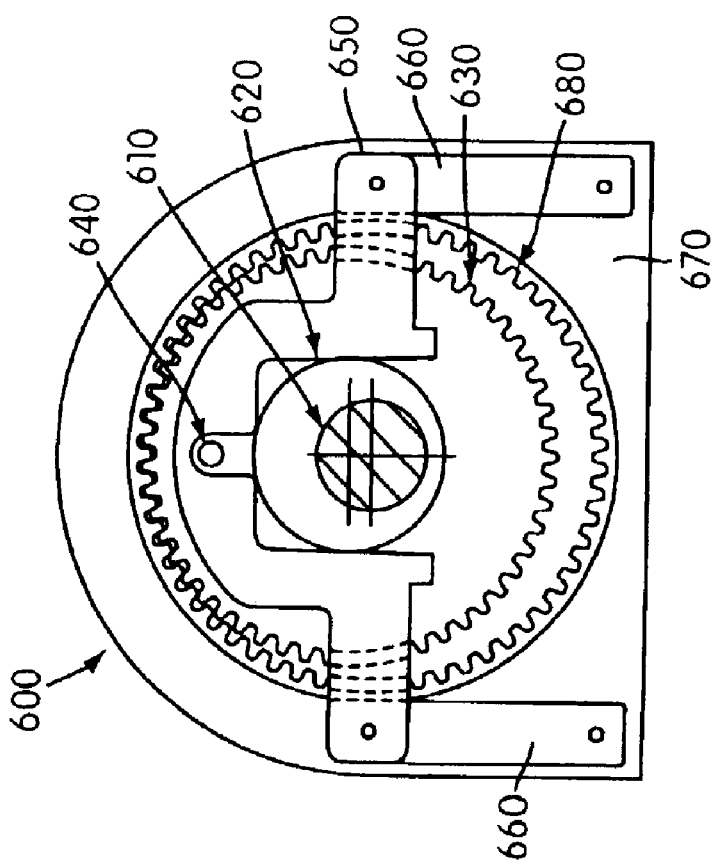

FIG. 9A illustrates a planetary gear drive 600, which may be used in place of the worm gear and wheel or the linear actuator as a backdrive-prevention mechanism in any of the embodiments of the present invention. For illustrative purposes, the planetary gear drive 600 is described as being incorporated into the gearbox 46 of the embodiment illustrated in FIG. 2 and described above. Like the worm gear that is preferably included in the gearbox 46 in FIG. 2, the planetary gear drive 600 serves the dual functions of stepping down the speed of the motor 34 (and stepping up the torque) and locking the selectively-actuated links 28, 30, 32 in place. As would be appreciated by one of ordinary skill in the art, the backdrive-preventing feature of the planetary gear drive 600 ensures that the motor 34 can drive the links 28, 30, 32 but that the links 28, 30, 32 cannot drive the motor 34.

As illustrated in FIG. 9A, the planetary gear drive 600 includes an input shaft 610 that is operatively connected to the motor 34 (not shown in FIG. 9A). An eccentric 620 is rigidly fixed to the input shaft 610 and rotates with the input shaft 610. A planetary gear 630 is mounted onto the eccentric 620 to allow the planetary gear 630 to rotate relative to the eccentric 620. A pin 640 is mounted to the planetary gear 630 and fits into a track formed on a base 650. The base 650 includes cam surfaces that abut the eccentric 620 to keep the base 650 laterally aligned (left/right as illustrated in FIG. 9A) with the planetary gear 630. The base 650 is mounted to a portion 670 of the gearbox 46 via two intermediate pivot bars 660 that permit the base 650 to move laterally to some extent as the base 650 follows the translational motion of the planetary gear 630. The planetary gear 630 meshes with a ring gear 680 that is operatively, rotationally connected to the torque transmitting member 50 (not shown in FIG. 9A).

During operation of the planetary gear drive 600, the motor 34 drives the input shaft 610 and eccentric 620, which causes the planetary gear 630 to translate in a circular path defined by the eccentricity of the eccentric 620. However, the pin 640, base 650, and pivot bars 660 prevent the planetary gear 630 from rotating. The circular translational movement of the planetary gear 630 is converted into rotation of the ring gear 680. The ring gear 680 rotationally drives the torque transmitting member 50. As would be appreciated by one of ordinary skill in the art, the planetary gear drive 600 thereby provides significant gear reduction while preventing backdrive.

FIG. 9B illustrates an additional planetary gear drive 690 that may be used instead of the above-described worm gear or planetary gear drive 600. The planetary gear drive 690 is simpler than the planetary gear drive 600, but produces slight output pulsations. As would also be a appreciated by one of ordinary skill in the art, a variety of other known backdrive-prevention mechanisms may alternatively be used without departing from the scope of the present invention. For example, a pawl and ratchet or a spring clutch could be used.

Figure 10:
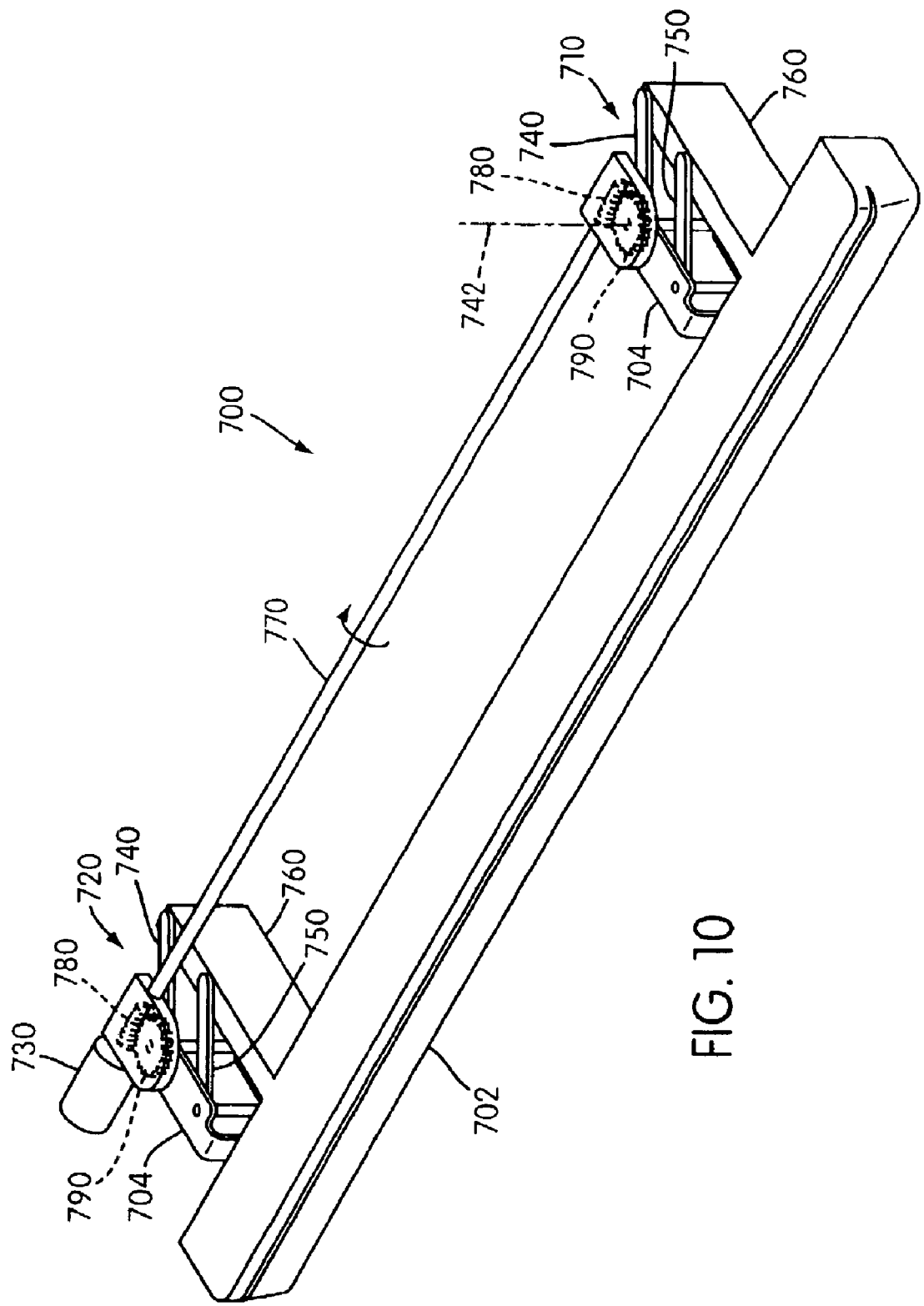
FIGS. 10 and 11 are perspective views of a further alternative embodiment of the present invention.
Figure 11:
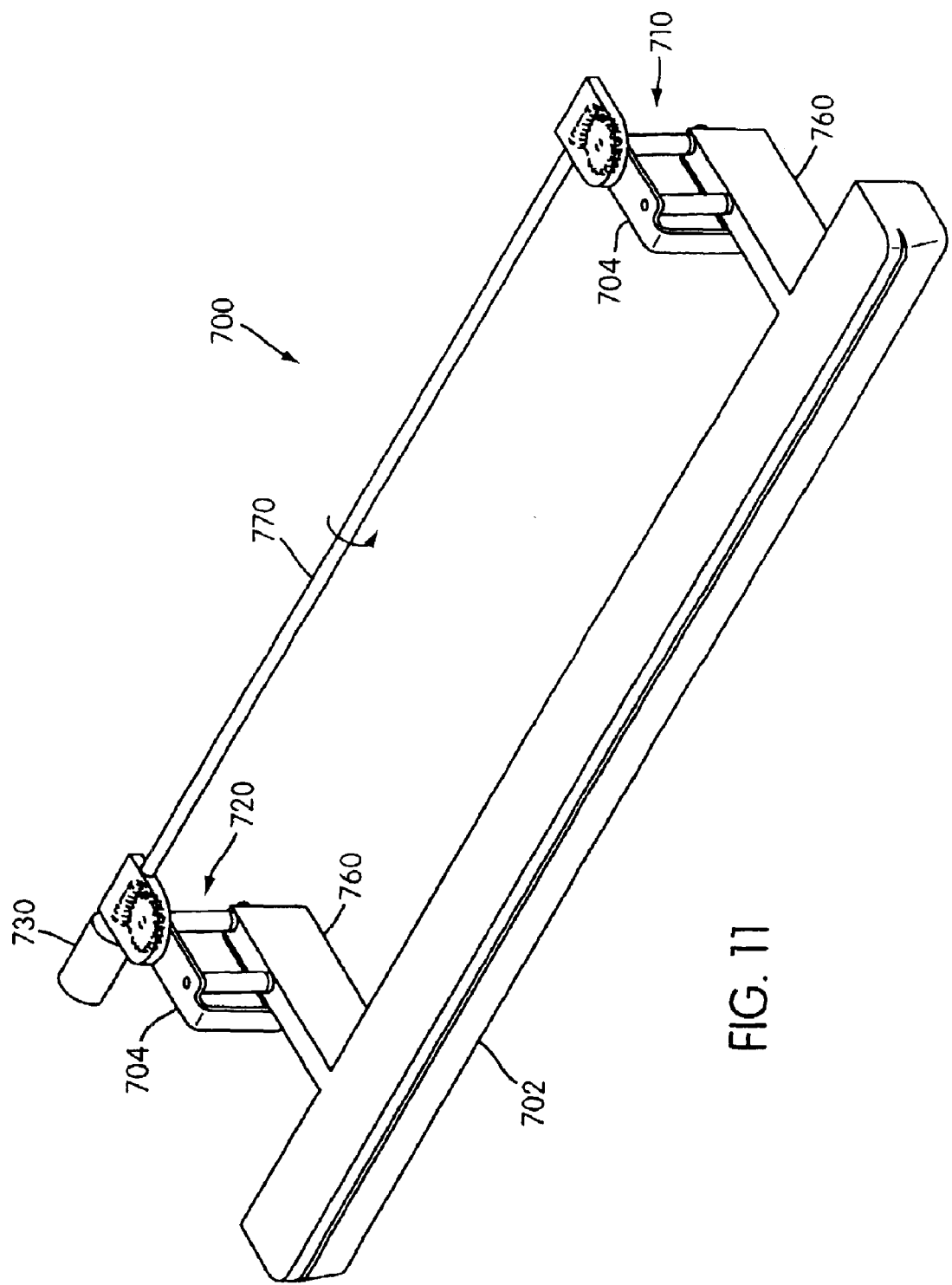

FIGS. 10 and 11 illustrate an additional alternative embodiment of a retractable running board assembly 700 according to the present invention. As in the previous embodiments, a longitudinally elongated retractable running board 702 is connected to an anchor 704 via a plurality of longitudinally spaced, selectively-actuated links 710, 720. A selectively-operable motor 730 is operatively connected to each of the links 710, 720 such that selective operation of the motor 730 concertedly actuates each of the links 710, 720 and moves the running board 702 between an extended position (as shown in FIG. 11) and a retracted position (as shown in FIG. 10).

As illustrated in FIG. 10, each of the links 710, 720 comprises a four-bar mechanism. A first leg of the four-bar mechanism is defined by the anchor 704. A second leg 740 connects to the first leg/anchor 704 for pivotal movement about a generally vertical axis 742. A third leg 750 also pivotally connects to the first leg/anchor 704. A fourth leg 760 pivotally connects to the second and third legs 740, 750 and is mounted to the running board 702. In this embodiment, the running board 702 and fourth legs 760 are integrally formed. However, the running board 702 and fourth legs 760 may also be separately formed.

The four-bar mechanisms defined by the links 710, 720 are preferably parallelograms. Consequently, during the extension and retraction of the running board assembly 700, the fourth legs 760 remain parallel to the anchor 704.

The lengths of each of the legs 704, 740, 750, 760 of the link 710 are preferably equal to the lengths of the corresponding legs 704, 740, 750, 760 of the link 720. Consequently, during concerted actuation of the links 710, 720, the resulting movement of the fourth legs 760 is synchronous and prevents the running board 702 from rotating relative to the anchor 704.

Because the pivotal axes of the links 710, 720 are generally vertically oriented (+/– several degrees and preferably within two degrees of vertical), the movement of the running board 702 relative to the anchor 704 is substantially limited to a horizontal path (+/– several vertical inches and preferably +/–3 vertical inches). During extension and retraction of the running board assembly 700, the running board translationally follows a curved path defined by the links 710, 720, but does not rotate. Consequently, the running board 702 is disposed at a substantially constant height regardless of its extension position. As illustrated in FIGS. 10 and 11, the running board 702 moves laterally-outwardly relative to the anchor 704 as it extends from its retracted position to its extended position.

The motor 730 is operatively connected to the links 710, 720 via a longitudinally elongated torque transmitting member 770. The torque transmitting member 770 may be directly rotationally mounted to the motor 730 or may be operatively connected to the motor 730 via a gear drive system that either steps up or steps down the speed of the torque transmitting member 770 relative to the motor 730.

In the illustrated embodiment, the torque transmitting member 770 is operatively connected to the second legs 740 of the links 710, 720 via worm gear drives that are provided at each connection between the torque transmitting member 770 and a link 710, 720. Each worm gear drive includes a worm gear 780 mounted onto the torque transmitting member 770. While separate worm gears 780 are illustrated, the separate worm gears 780 may alternatively each comprise a part of a single extended worm gear without departing from the scope of the present invention. The worm gear drive also includes a worm wheel 790 that meshes with the worm gear 780 and is mounted to the second leg 740 for common rotational movement relative to the anchor 704 about the axis 742. During extension or retraction of the running board assembly 700, the motor 730 rotates the torque transmitting member 770, which, in turn, concertedly actuates the second legs 740 of the links 710, 720. Actuation of the second legs 740 actuates the links 710, 720 and extends or retracts the running board 702.

As in the previous embodiments, because the worm gear drives prevent backdrive of the links 710, 720, the running board assembly 700 remains in an essentially locked position unless actuated by the motor 730. As would be appreciated by one of ordinary skill in the art, a variety of other backdrive-prevention mechanisms may also be used (for example, either of the planetary gear drives 600 or 690) without departing from the scope of the present invention.

Furthermore, a backdrive-prevention mechanism may alternatively be omitted altogether. Because the running board assembly 700 is limited to generally horizontal movement, the vertical weight that is applied to the running board 702 when a person steps onto the running board 702 will not tend to extend or contract the running board assembly 700. Accordingly, unlike in the previous embodiments where the weight of a passenger on a running board creates a force that tends to actuate the retractable running board assembly and backdrive the driving mechanism, backdrive is not as significant a problem where the path of the running board 702 is generally horizontal. A backdrive-prevention mechanism is nonetheless preferably included in the retractable running board assembly 700 because some backdrive-causing lateral loads could be exerted on the running board 702 during normal use.

As in the previous embodiments, the anchor 704 may form or be attached to any desired part on a vehicle.

Figure 12:
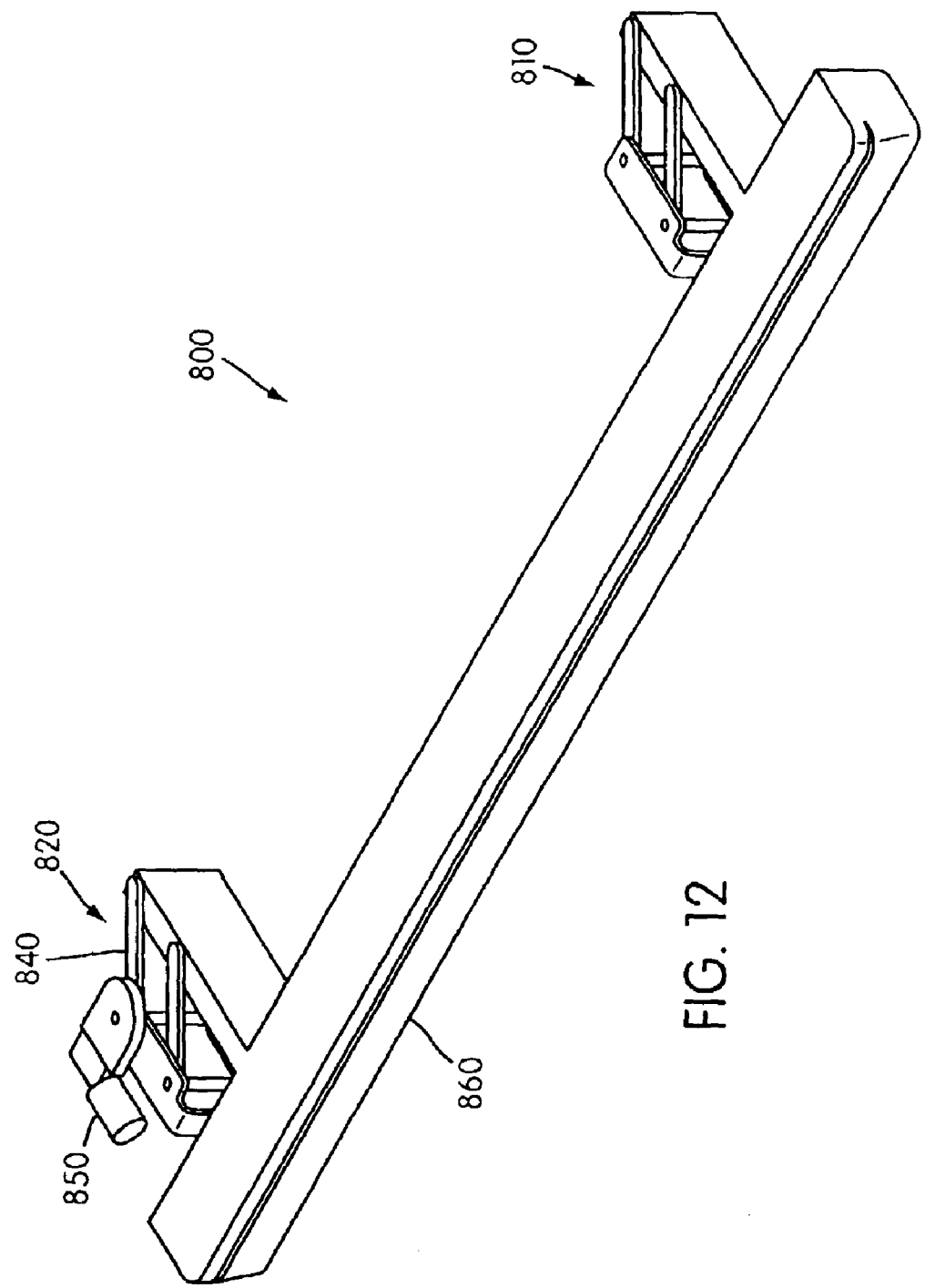
FIGS. 12 and 13 are perspective views of a further alternative embodiment of the present invention.
Figure 13:
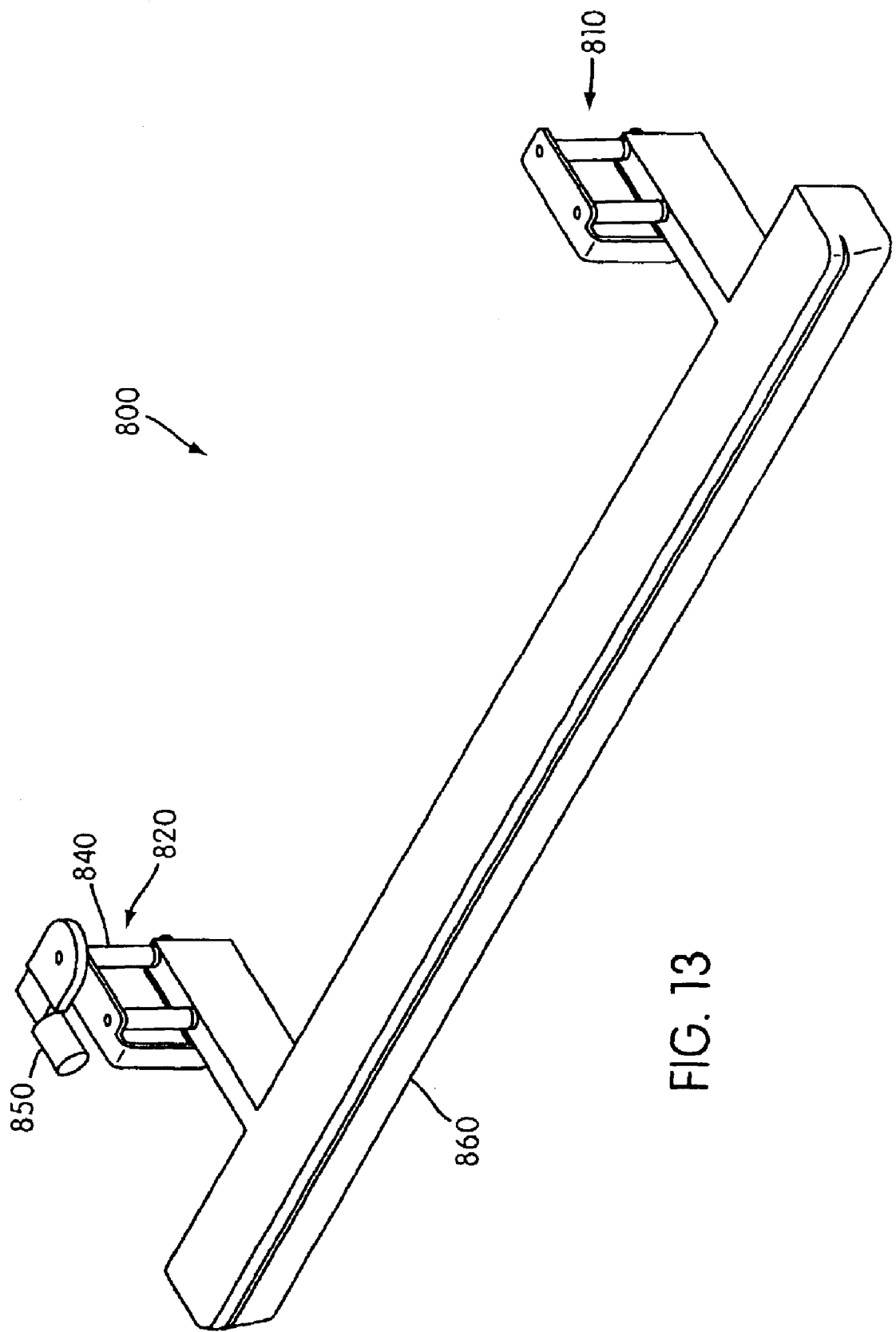

While the above-described embodiments include either two or three powered links attaching each running board to each anchor, except where otherwise expressly stated, a running board assembly according to the present invention may have more or less powered links. Further, additional freely moving links may also be provided, as is known in the art. For example, FIGS. 12 and 13 illustrate an additional embodiment of a retractable running board assembly 800 according to the present invention. This running board assembly 800 is generally identical to the running board assembly 700 illustrated in FIGS. 10 and 11 except that only one of the two links 810, 820 is powered (driven). A second leg 840 of the selectively-actuated link 820 is operatively connected to a motor 850, preferably via a worm gear drive and/or other gear reduction mechanisms. Consequently, the link 820 is selectively actuated by the motor 850. Conversely, the free link 810 is not directly operatively connected to the motor 850 and simply follows the movement of the link 820 as forces are transferred from the link 820, through the running board 860, to the link 810.

The running board assembly 800 can use just a single powered link 820 because, as is analogously discussed above with respect to the retractable running board assembly 700, the limited horizontal path of the running board 860 ensures that significant backdrive creating forces are not applied to the links 810, 820 and motor 850. One powered link 820 is therefore sufficient to hold the running board 860 stationary.

Figure 14:
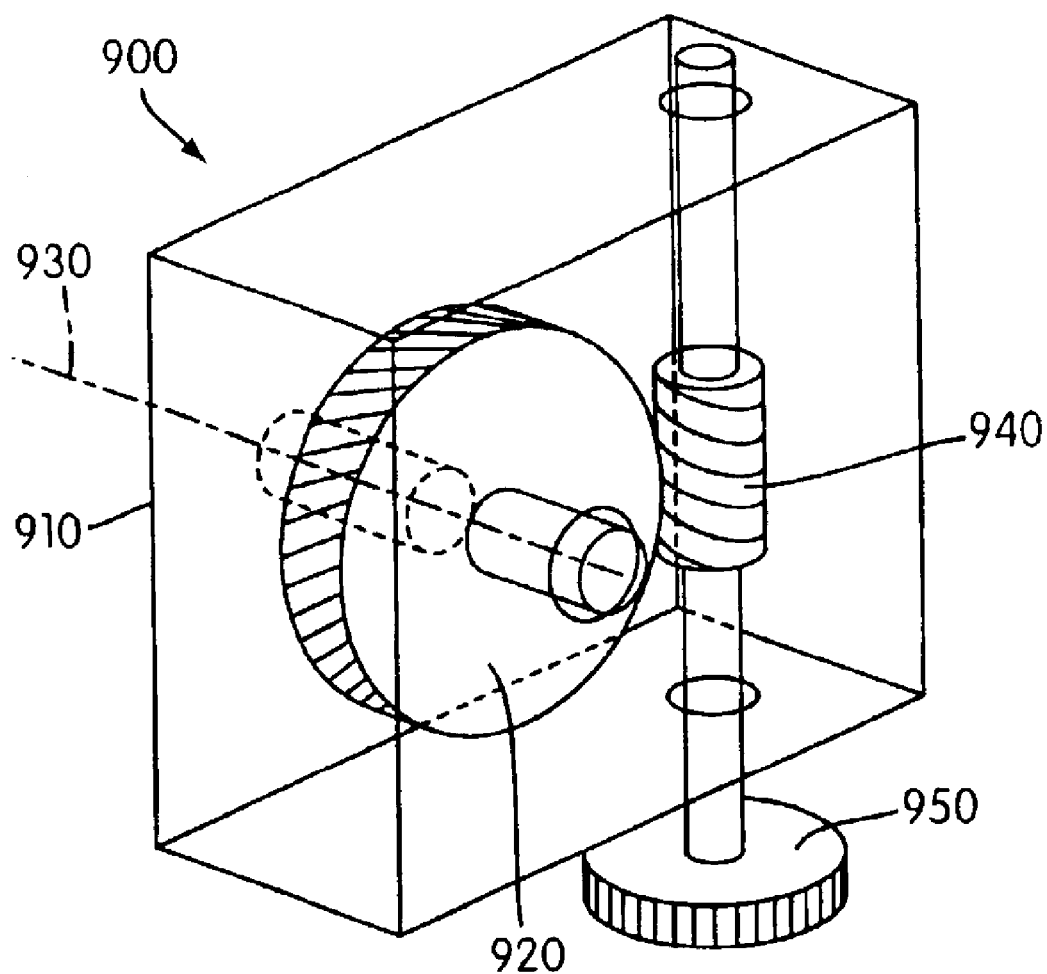
FIGS. 14–16 are perspective views of manual gearboxes according to further alternative embodiments of the present invention.

While the selectively-operable driving mechanism in the previous embodiments comprises an electric motor such as the motor 34 illustrated in FIG. 2, the selectively operable driving mechanism according to the present invention encompasses a variety of other actuators, both automatic and manual, as well. Such selectively-operable driving mechanisms include hydraulic or air motors, linear actuators, hydraulic cylinders, etc. For example, FIG. 14 illustrates a manual selectively-operable driving mechanism, which is similar to the previously described embodiments except that a manually-rotatable head replaces the electric motors in the previous embodiments. A gearbox 900 comprises a housing 910, a worm wheel 920 pivotally connected to the housing 910 for rotation about a worm wheel axis 930, a worm gear 940 pivotally connected to the housing 910 and meshing with the worm wheel 920, and a manually-rotatable head in the form of a hand-operated control wheel 950 operatively connected to the worm gear 940.

The worm wheel 920 may be operatively, rotationally, coupled to any of the previously described running board assemblies. For example, the gearbox 900 may replace the gearbox 46 of the retractable running board assembly 20 illustrated in FIG. 2, in which case the worm wheel 920 would be operatively connected to the torque member 50. To use the manually operated gearbox 900, an operator may use his/her hands to rotate the control wheel 950, which rotates the worm gear 940. Rotation of the worm gear 940 rotates the worm wheel 920, which rotates the torque member 50 and actuates the retractable running board assembly 20. As described above, the worm wheel 920 and gear 940 prevent backdrive of the gearbox 900 and attached torque member 50 and running board assembly 20.

Figure 15:
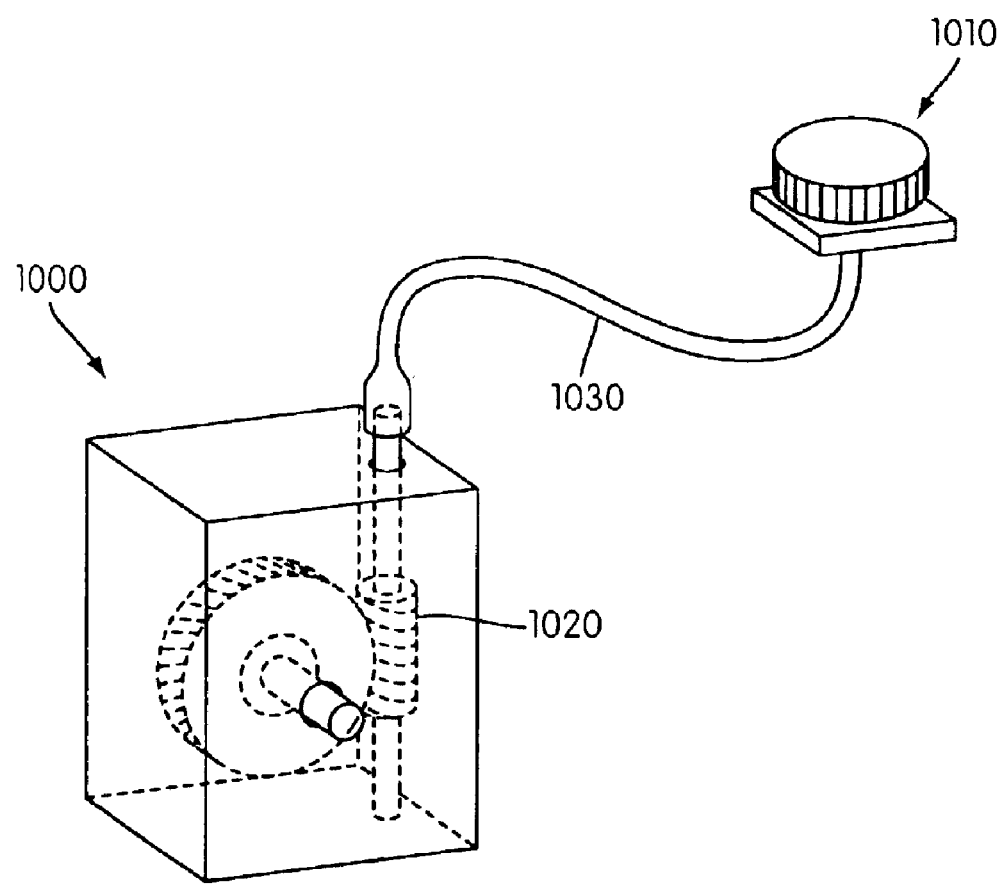

FIG. 15 illustrates a possible modification to the gearbox 900 illustrated in FIG. 14. This remotely, manually-operated gearbox 1000 is very similar to the gearbox 900, except that a control wheel 1010 of the gearbox 1000 is remotely located. Accordingly, the control wheel 1010 is operatively connected to a worm gear 1020 via a flexible torque cable 1030 that is similar to the cables described above with respect to previous embodiments. The flexible torque cable allows the control wheel 1010 to be mounted in any convenient position in a vehicle. For example, the control wheel may be mounted within the cab of a truck so that an operator can manually operate the retractable running board assembly without having to first exit the vehicle to gain access to the control wheel.

Figure 16:
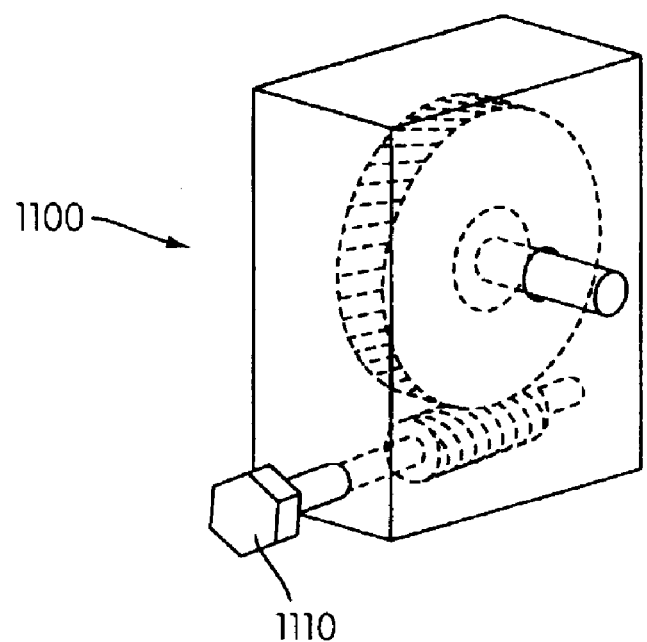

FIG. 16 illustrates a further possible modification to the gearbox 900. A the gearbox 1100 is similar to the gearbox 900 except that the manually-rotatable head comprises a hex head 1110 instead of a control wheel 950 as is utilized by the gearbox 900. The hex head 1110 is preferably sized to match a jack tool, lug wrench, or other tool that is typically kept in the associated vehicle. To operate the gearbox 1100, an operator connects the tool to the hex head 1110 and rotates the tool to rotate the hex head 1110 and actuate the associated retractable running board assembly.

Figure 17:
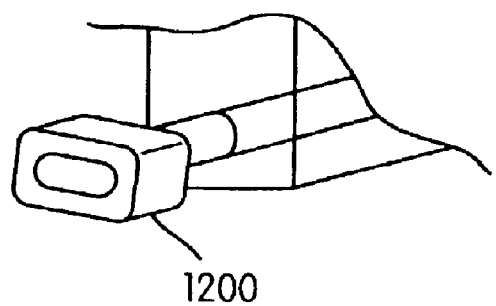
FIG. 17 is a partial perspective view of a manual gearbox according to a further alternative embodiment of the present invention.

FIG. 17 illustrates a further manually-rotatable head in the form of a hollow receiver 1200 that may replace the hex head 1110 in the gearbox 1100. The hollow receiver 1200 may be rotated using a drive blade that such as a large flat-head screwdriver or the prying end of a jack tool. As would be appreciated by one of ordinary skill in the art, a variety of alternatively shaped pieces may replace the above-described control wheel 950, hex head 1110, or hollow receiver 1200.

The manual driving mechanisms shown in FIGS. 14–17 for manually driving the torque transmitting member may be provided in addition to or in lieu of an electric motor. Specifically, if the vehicle loses power, the operator can bypass the motor and manually drive the torque transmitting via the manual driving mechanism to manually actuate the running board.

Figure 18:
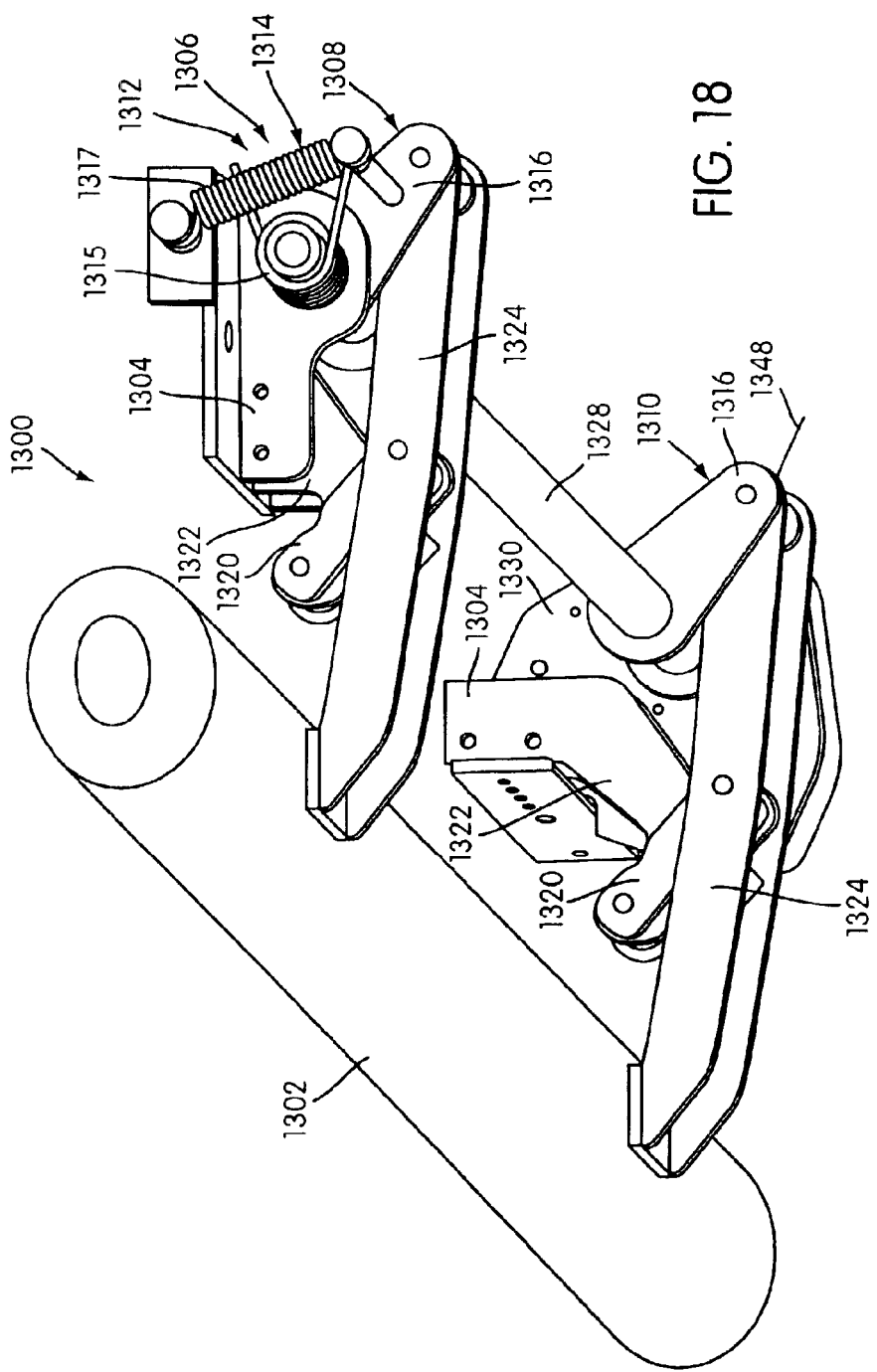
FIG. 18 is a perspective view of an alternative embodiment of a retractable running board with the running board in a retracted position.
Figure 19:
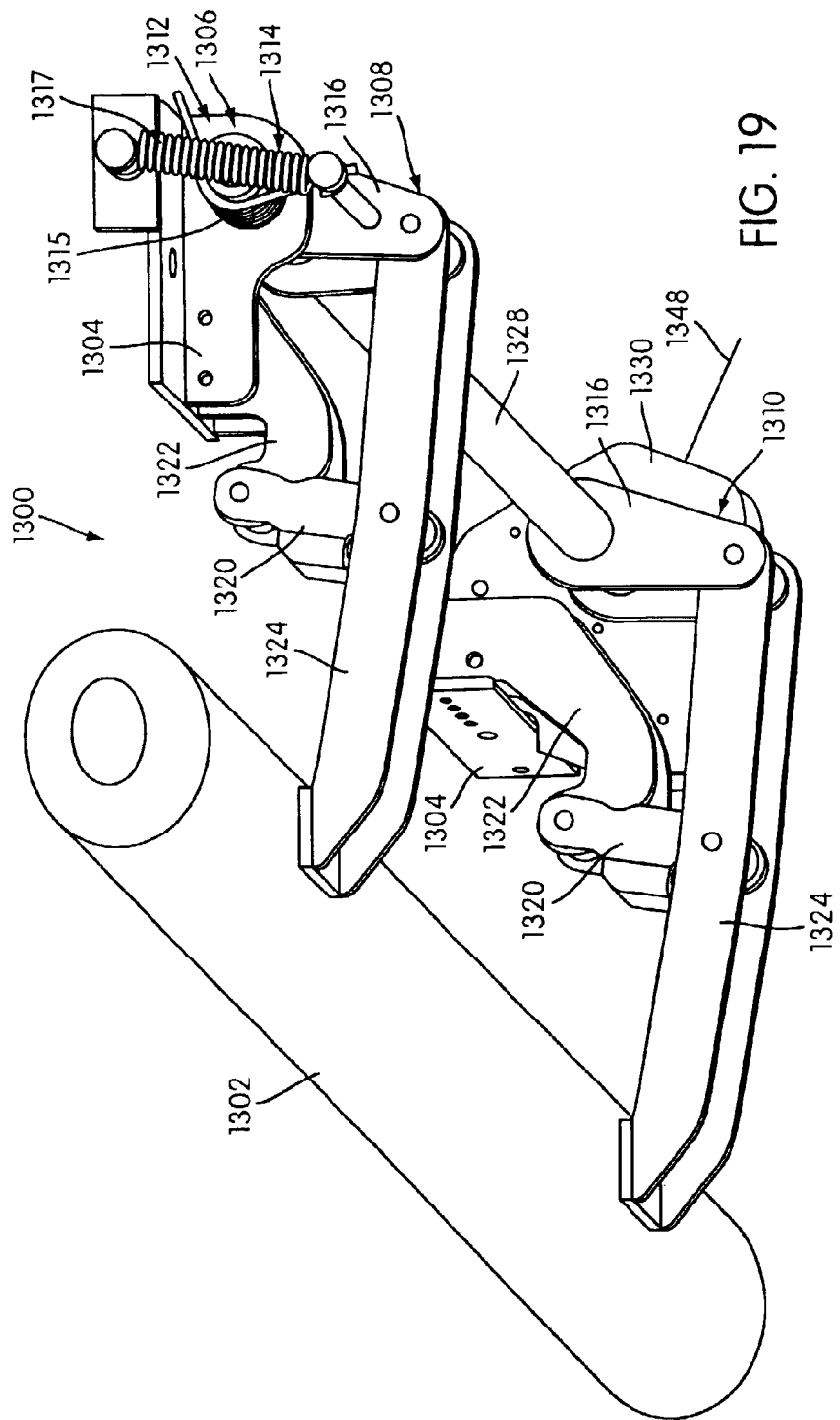
FIG. 19 is a perspective view of the retractable running board shown in FIG. 18 with the running board in a primary extended position.
Figure 20:
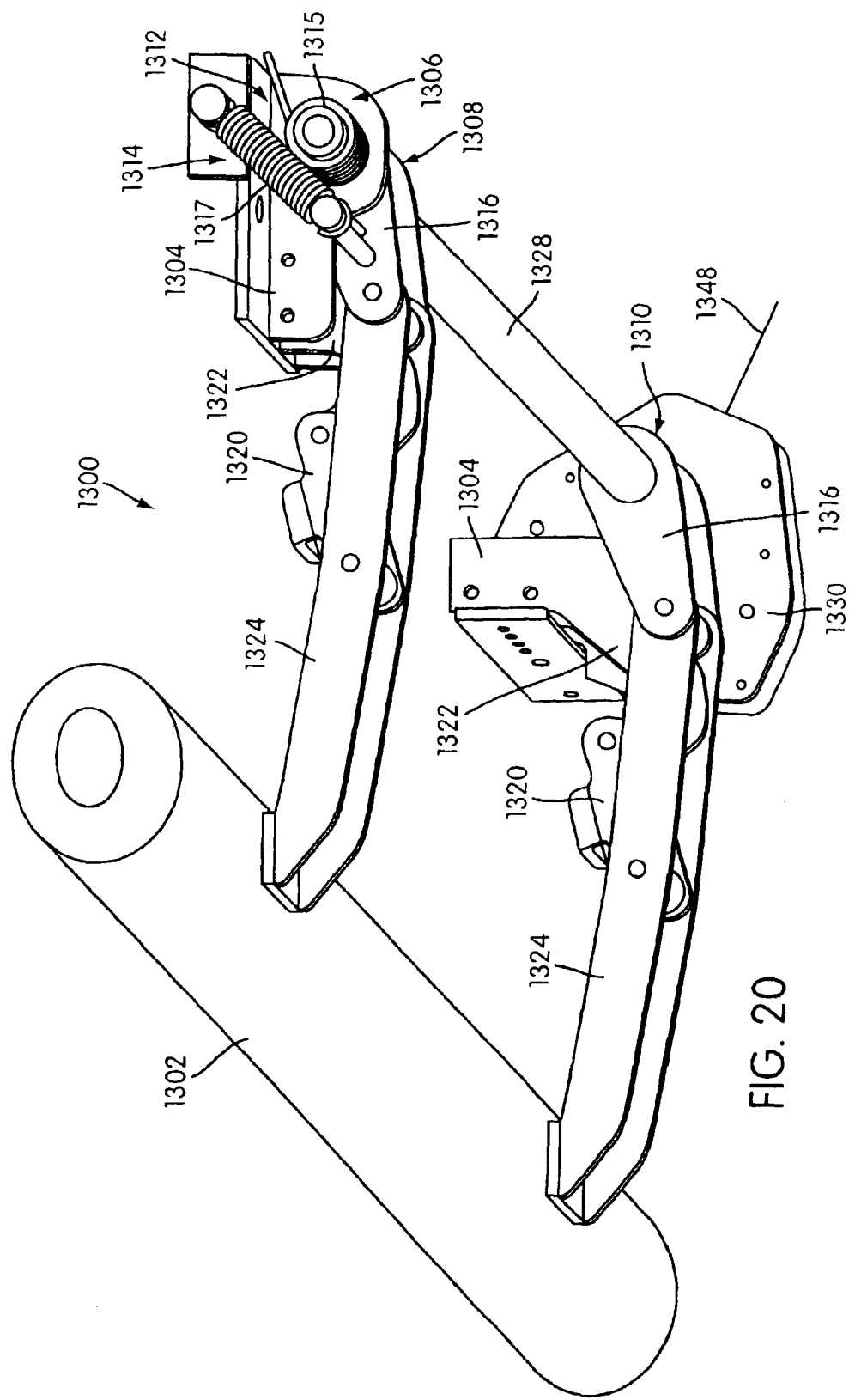
FIG. 20 is a perspective view of the retractable running board shown in FIG. 18 with the running board in a secondary extended position.
Figure 21:
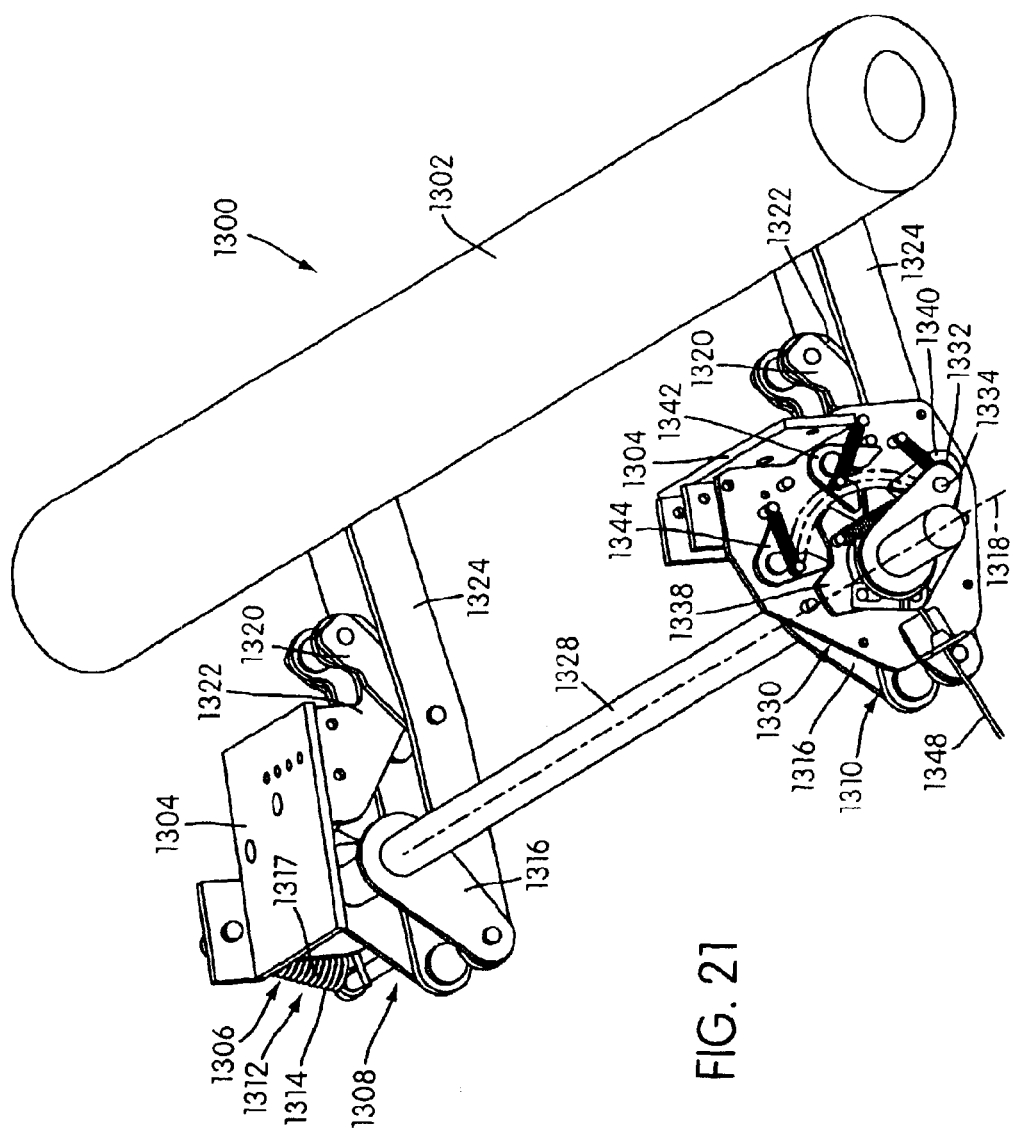
FIG. 21 is a perspective view of the retractable running board shown in FIG. 18 with the running board in a retracted position.
Figure 22:
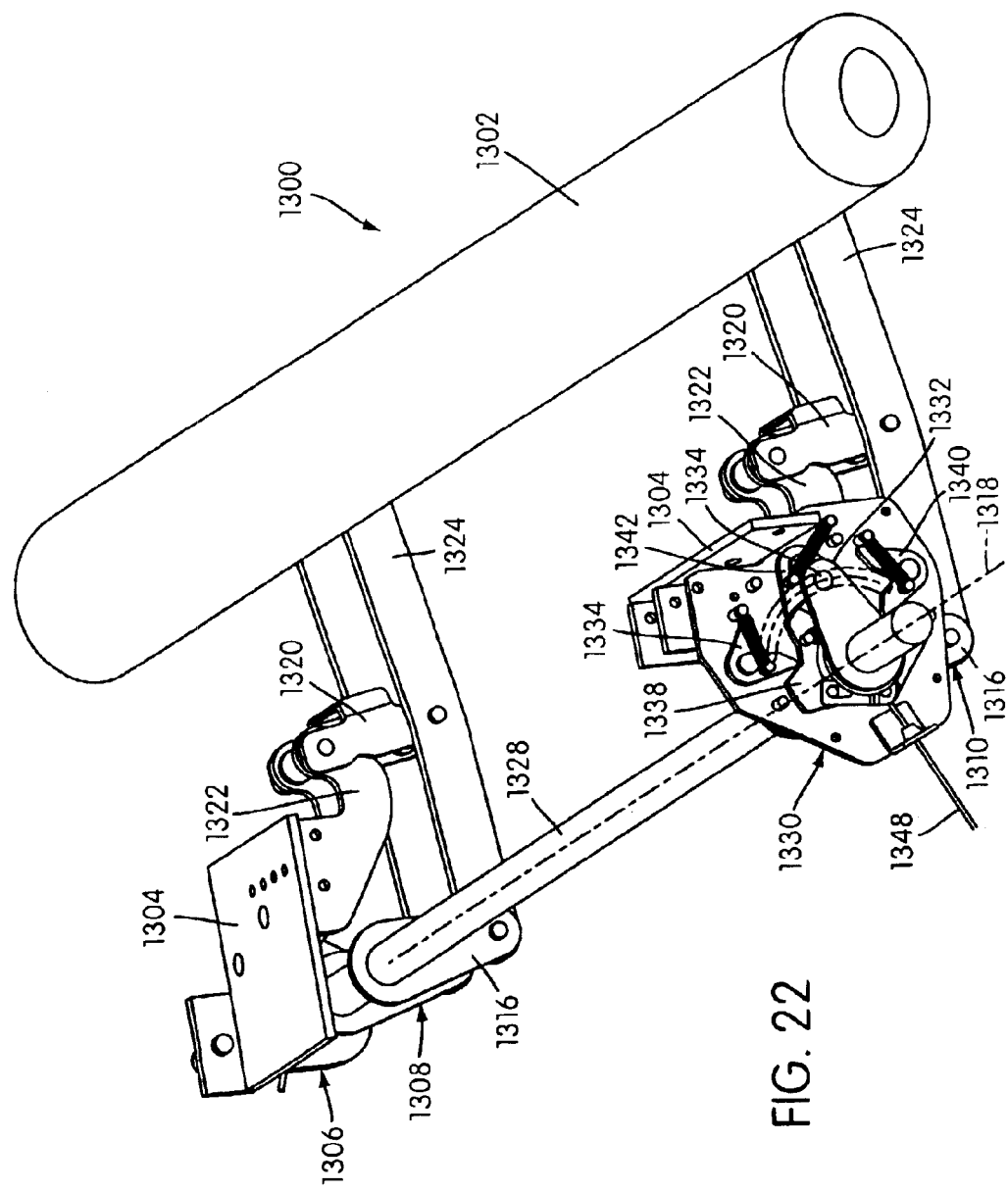
FIG. 22 is a perspective view of the retractable running board shown in FIG. 18 with the running board in a primary extended position.

FIGS. 18–22 illustrate an additional alternative embodiment of a retractable running board assembly 1300. As in the previous embodiments, a longitudinally elongated retractable running board 1302 (which has a non-circular cross-section, and in this case ovular) is connected to an anchor 1304 via a running board moving assembly 1306. The running board moving assembly 1306 includes first and second selectively actuated links 1308, 1310 that movably support the running board 1302 at longitudinally spaced apart positions. The links 1308, 1310 are constructed and arranged such that, when the running board assembly 1300 is mounted to the vehicle in the operative position, actuation of the links 1308, 1310 moves the running board 1302 between a retracted position (as shown in FIGS. 18 and 21), a primary extended position (as shown in FIGS. 19 and 22) (also referred to as the step position), wherein the running board 1302 is moved at least outwardly with respect to the vehicle from the retracted position for facilitating passenger entry into the passenger compartment via the door opening, and a secondary extended position (as shown in FIG. 20) (also referred to as the roof position), wherein the running board 1302 is moved upwardly from the primary extended position for facilitating passenger access to a roof of the vehicle for loading articles onto the roof or washing the roof, for example.

As shown in FIGS. 18–20, a selectively-operable driving mechanism 1312 is operatively connected to the links 1308, 1310 such that, when the running board assembly 1300 is mounted in the operative position, selective operation of the driving mechanism 1312 actuates the links 1308, 1310 to move the running board 1302 between the retracted, the primary extended, and the secondary extended positions. In the illustrated embodiment, the driving mechanism 1312 includes a biasing structure 1314 that is operatively connected to the links 1308, 1310 to bias the running board 1302 away from the retracted position towards the primary extended and secondary extended positions, as will be further discussed.

As best shown in FIGS. 18–20, each of the links 1308, 1310 comprises a four bar mechanism. A first leg of the four bar mechanism is defined by the anchor 1304. A second leg 1316 connects to the first leg/anchor 1304 for pivotal movement about a generally horizontal axis 1318 (see FIGS. 21–22). A third leg 1320 also pivotally connects an extension 1322 provided on the first leg/anchor 1304. A fourth leg 1324 pivotally connects to the second and third legs 1316, 1320, and is mounted to the running board 1302. The running board 1302 and fourth legs 1324 may be formed as a single structure or may be separately formed and rigidly connected to one another.

During movement of the running board 1302 between the retracted, primary extended, and secondary extended positions, the running board 1302 moves in an arcuate path, but does not rotate, and thus maintains essentially the same orientation throughout its range of movement. As a result, the running board 1302 is disposed at different vertical heights depending on whether it is in the retracted, primary extended, or secondary extended position.

Figure 23:
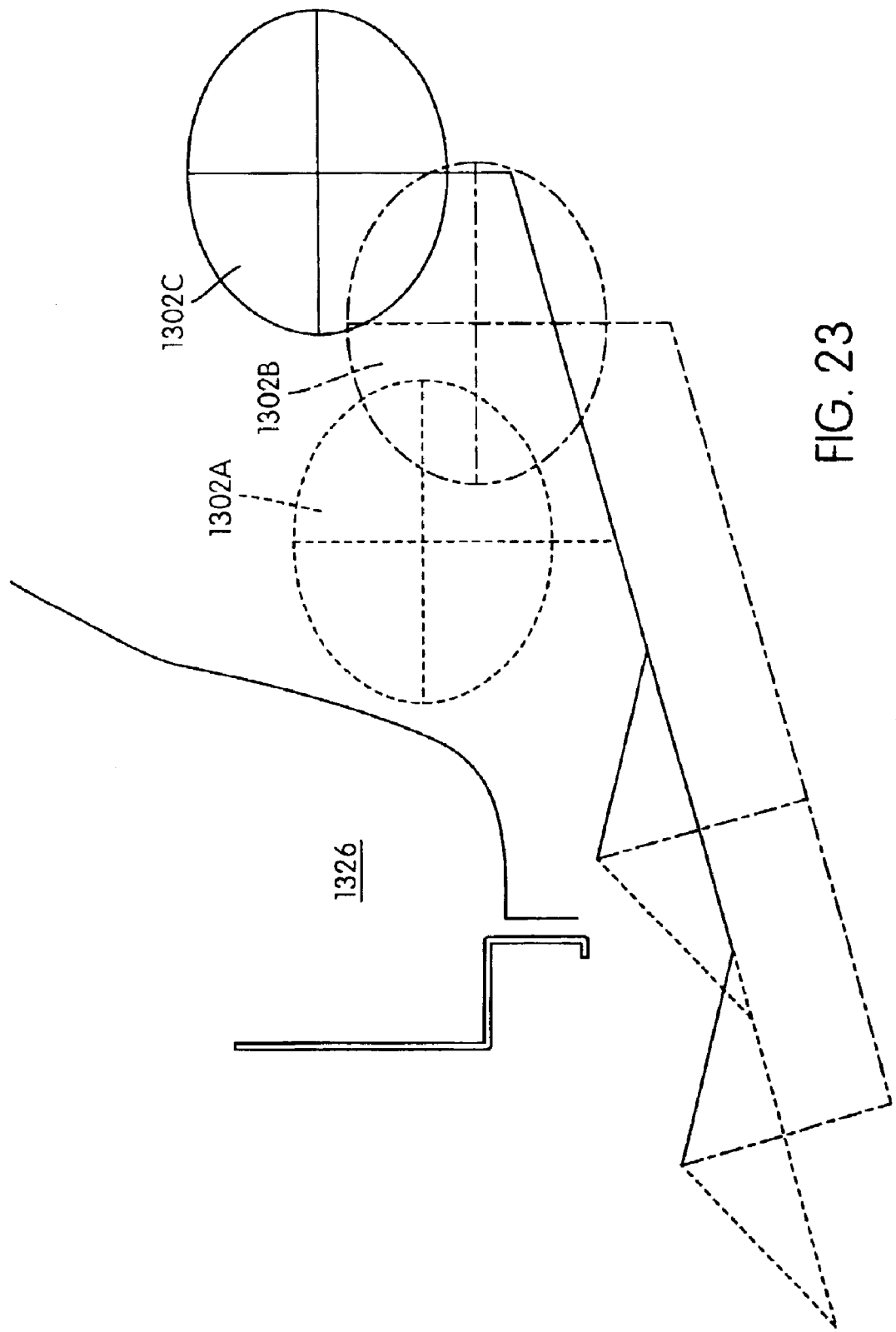
FIG. 23 is a schematic view of the retractable running board shown in FIG. 18 illustrating the relation between the retracted position, the primary extended position, and the secondary extended position of the running board.

In the embodiment, the four bar mechanism comprises a parallelogram such that the path of the running board 1302 has essentially no rotational component. Thus, the running board 1302 moves downwardly and outwardly relative to the vehicle and anchor 1304 as it moves from its retracted position to the primary extended position. The running board 1302 moves upwardly and outwardly as it moves from the primary extended position to the secondary extended position. FIG. 23 illustrates the relation between the retracted position, the primary extended position, and the secondary extended position of the running board 1302 with respect to a side wall 1326 of a vehicle. Specifically, the running board 1302A is in the retracted position, the running board 1302B is in the primary extended position, and the running board 1302C is in the secondary extended position.

While in this embodiment the retracted, primary extended, and secondary extended positions of the running board 1302 are both vertically and horizontally offset with respect to one another, the present invention should not be understood to be so limited. Rather, except where extension and retraction are expressly limited to include both horizontal and vertical components, the path of the running board 1302 may comprise one or more of horizontal movement, vertical movement, and rotational components.

The running board moving assembly 1306 further includes a longitudinally elongated torque transmitting member 1328 that is mounted to each of the second legs 1316 of the links 1308, 1310 for a common rotation with the second legs 1316 about the axis 1318 which is generally parallel to the longitudinal direction of the running board 1302. The torque transmitting member 1328 may be rotationally coupled to each of the second legs 1316 using any of a variety of methods that would be understood by one skilled in the art.

One end of the torque transmitting member 1328 is operatively connected to the biasing structure 1314. The biasing structure 1314 includes a torsion spring 1315 that is mounted between the anchor 1304 and the torque transmitting member 1328. The torsion spring 1315 is structured to bias the torque transmitting member 1328 in a clockwise direction (as viewed in FIGS. 18–20), which in turn concertedly actuates the second legs 1316 of the links 1308, 1310 to bias the running board 1302 away from the retracted position towards the secondary extended position. The running board 1302 must be manually moved in its retracting direction, against biasing from the torsion spring 1315, from the secondary extended position towards the primary extended and retracted positions.

The biasing structure 1314 also includes an over-center spring 1317 that is mounted between the anchor 1304 and the second leg 1316. The over-center spring 1317 provides a biasing force that facilitates movement of the running board 1302 from the primary extended position to the secondary extended position. The over-center spring 1317 also provides a biasing force that facilitates movement of the running board 1302 from the primary extended position to the retracted position.

That is, the torsion spring 1315 provides the majority of the biasing force to rotate the running board 1302 from the retracted position towards the secondary extended position. The over-center spring 1317 provides an additional biasing force to facilitate movement of the running board 1302 from the primary extended position to the secondary extended position. Further, the over-center spring 1317 is structured to provide a biasing force to assist rotation of the running board 1302 from the primary extended position to the retracted position. Specifically, the over-center spring 1317 is structured to provide a biasing force that is opposite in direction to the biasing force of the torsion spring 1315 when the running board 1302 is moved from the primary extended position to the retracted position so as to offset the biasing force of the torsion spring and hence facilitate movement of the running board 1302 from the primary extended position to the retracted position.

Figure 24:
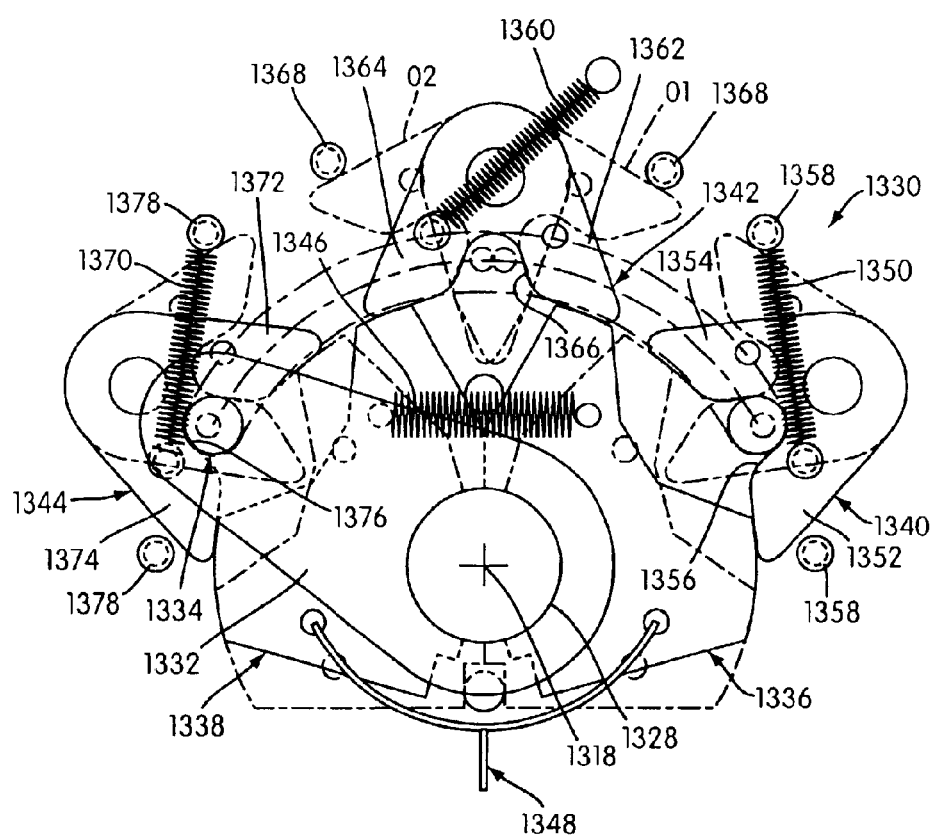
FIG. 24 is a front view of a latch and pawl system utilized for locking a running board, such as the running board shown in FIG. 18, in an extended position, a primary extended position, and a secondary extended position.

As shown in FIGS. 21, 22, and 24, a locking mechanism 1330 is operatively connected to the opposite end of the torque transmitting member 1328 to lock the running board 1302 in the retracted, primary extended, and secondary extended positions.

Specifically, the torque transmitting member 1328 is rigidly attached to a leg 1332 having an outwardly extending pin 1334, also referred to as a striker. The leg 1334 rotates about the axis 1318 of the torque transmitting member 1328 as the running board 1302 is moved between the retracted, primary extended, and secondary extended positions. The striker 1334 of the leg 1332 is locked in position by the locking mechanism 1330 to lock the torque transmitting member 1328 and hence the running board 1302 in the retracted, primary extended, and secondary extended positions. For example, FIG. 21 shows the striker 1334 locked in position by the locking mechanism 1330 to lock the running board 1302 in the retracted position. FIG. 22 shows the striker 1334 locked in position by the locking mechanism 1330 to lock the running board 1302 in the primary extended position.

As shown in FIG. 24, the locking mechanism 1330 is in the form of a latch and pawl system that includes first and second pawls 1336, 1338 and first, second and third latches 1340, 1342, 1344. In the illustrated embodiment, the first latch 1340 engages the striker 1334 to lock the running board 1302 in the retracted position (see FIG. 21), the second latch 1342 engages the striker 1334 to lock the running board 1302 in the primary extended position (see FIG. 22), and the third latch 1344 engages the striker 1334 to lock the running board 1302 in the secondary extended position. The pawls 1336, 1338 are movable by the user between an open position (shown in a dashed line) and a closed position (shown in a solid line) to unlock and lock the latches 1340, 1342, 1344, thereby controlling movement of the running board 1302 between the retracted, primary extended, and secondary extended positions.

Specifically, the pawls 1336, 1338 are normally biased by a spring 1346 into the closed position. The pawls 1336, 1338 can be moved into the open position, against biasing from the spring 1346, by a cable mechanism 1348 that is operatively connected to the pawls 1336, 1338. The cable mechanism 1348 can be pulled to move the pawls 1336, 1338 to the open position. The cable mechanism 1348 is simply released to allow the pawls 1336, 1338 to return to the closed position under biasing from the spring 1346. The cable mechanism 1348 may include a handle, located on the interior or exterior of the vehicle, to facilitate movement of the cable mechanism 1348 from the closed position to open position by the user.

The first, second and third latches 1340, 1342, 1344 are rotatably mounted for rotation between open and closed positions. In the open position, the latches 1340, 1342, 1344 are positioned to receive the striker 1334. In the closed position, the latches 1340, 1342, 1344 are positioned to prevent movement of the striker 1334.

As shown in FIG. 24, the first latch 1340 is rotatably mounted for rotation between an open position (shown in a dashed line) and a closed position (shown in a solid line). The first latch 1340 is biased to the open position by a spring 1350. The first latch 1340 includes legs 1352, 1354 that define a recess 1356 therebetween for receiving the striker 1334. Stop structures 1358 are provided to define a range of rotation of the first latch 1340, and hence define the open and closed positions of the first latch 1340.

The second latch 1342 is rotatably mounted for rotation between a first open position O1 (shown in a dashed line), a closed position (shown in a solid line), and a second open position O2 (shown in a dashed line). The second latch 1342 is biased to either the first open position O1 or the second open position O2 by a spring 1360. The second latch 1342 includes legs 1362, 1364 that define a recess 1366 therebetween for receiving the striker 1334. Stop structures 1368 are provided to define a range of rotation of the second latch 1342, and hence define the first open and second open positions of the second latch 1342.

The third latch 1346 is rotatably mounted for rotation between an open position (shown in a dashed line) and a closed position (shown in a solid line). The third latch 1346 is biased to the open position by a spring 1370. The third latch 1346 includes legs 1372, 1374 that define a recess 1376 therebetween for receiving the striker 1334. Stop structures 1378 are provided to define a range of rotation of the third latch 1346, and hence define the open and closed positions of the third latch 1346.

In the illustrated embodiment, the springs 1350, 1360, and 1370 are over-center springs structured to leave the respective latch in a position in which the recess of the respective ratchet faces the direction of movement of the striker 1334. Thus, the latch is positioned to receive the striker 1334 within the recess thereof.

Operation of the locking mechanism 1330 will now be described in greater detail. When the pawls 1336, 1338 are in the open position, the pawls 1336, 1338 are structured to allow the latches 1340, 1342, 1346 to rotate to the open positions. When the pawls 1336, 1338 are in the closed position, the pawls 1336, 1338 are structured to be engagable with at least one of the legs of the latches 1340, 1342, 1346 to block and prevent rotation of the latches 1340, 1342, 1346.

Specifically, when the running board 1302 is in the retracted position, the striker 1334 is positioned within the recess 1356 of the first latch 1340 with the first latch 1340 locked in the closed position by the closed pawl 1336. That is, pawl 1336 engages the leg 1352 to prevent rotation of the first latch 1340. As a result, the striker 1334 is locked by the first latch 1340 which locks the torque transmitting member 1328 and hence the running board 1302 in the retracted position. Movement of the pawls 1336, 1338 to the open position by the cable mechanism 1348 allows the first latch 1340 to rotate towards the open position, which allows the torque transmitting member 1328 to rotate, which in turn allows the running board 1302 to move from retracted position towards the primary extended position.

As the running board 1302 moves from retracted position towards the primary extended position, the striker 1334 disengages from the first latch 1340 and moves towards the second latch 1342, which is in the first open position O1. The cable mechanism 1348 can be released to allow the pawls 1336, 1338 to return to the closed position. The striker 1334 engages the second latch 1342 and moves the second latch 1342 towards the closed position. When the second latch 1342 reaches the closed position, the striker 1334 is positioned within the recess 1366 of the second latch 1342 with the second latch 1342 locked in the closed position by the closed pawls 1336, 1338. That is, the pawls 1336, 1338 engage respective leg 1362, 1364 to prevent rotation of the second latch 1342. As a result, the striker 1334 is locked by the second latch 1342 which locks the torque transmitting member 1328 and hence the running board 1302 in the primary extended position. Movement of the pawls 1336, 1338 to the open position by the cable mechanism 1348 allows the second latch 1342 to rotate towards the second open position O2, which allows the torque transmitting member 1328 to rotate, which in turn allows the running board 1302 to move from primary extended position towards the secondary extended position. Movement of the pawls 1336, 1338 to the open position also allows the second latch 1342 to rotate towards the first open position O1 which allows the torque transmitting member 1328 to rotate, which in turn allows the running board 1302 to move from primary extended position back into the retracted position.

As the running board 1302 moves from primary extended position towards the secondary extended position, the striker 1334 disengages from the second latch 1342 and moves towards the third latch 1344, which is in the open position. The cable mechanism 1348 can be released to allow the pawls 1336, 1338 to return to the closed position. The striker 1334 engages the third latch 1344 and moves the third latch 1344 towards the closed position. When the third latch 1344 reaches the closed position, the striker 1334 is positioned within the recess 1376 of the third latch 1344 with the third latch 1344 locked in the closed position by the closed pawl 1338. That is, the pawl 1338 engages the leg 1374 to prevent rotation of the third latch 1344. As a result, the striker 1334 is locked by the third latch 1344 which locks the torque transmitting member 1328 and hence the running board 1302 in the secondary extended position. Movement of the pawls 1336, 1338 to the open position by the cable mechanism 1348 allows the third latch 1344 to rotate towards the open position, which allows the torque transmitting member 1328 to rotate, which in turn allows the running board 1302 to move from secondary extended position back towards the primary extended position.

If the pawls 1336, 1338 are held in the open position by the cable mechanism 1348, the running board 1302 can move from the retracted position, through the primary extended position and into the secondary extended position under biasing from the biasing structure 1314. To move the running board 1302 from the secondary extended position to the primary extended position or from the primary extended position to the retracted position, the user must move the pawls 1336, 1338 to the open position by the cable mechanism 1348 and manually push the running board 1302 against biasing of the biasing structure 1314.

That is, holding the pawls 1336, 1338 in the open position by the cable mechanism 1348 allows the latches 1340, 1342, 1344 to move to the open positions, which in turn allows the torque transmitting member 1328 to rotate without the striker 1334 locking up in any of the retracted, primary extended, and secondary extended positions.

It is contemplated in this illustrated embodiment that the running board 1302 will be extended to is primary extended and secondary extended positions as follows. The user activates a handle or other structure to pull cable 1348 and move pawls 1336, 1338 to their open positions and frees the latches 1340, 1342, 1344. This allows torsion spring 1315 to automatically move the board 1302 in the extending direction with striker 1334 disengaging from latch 1340. A short pull of the cable 1340 will cause the board 1302 to go to the primary extended position with the striker 1334 engaging with striker 1340, and the pawls 1336, 1338 returning to their close position to prevent further travel. A longer pull will allow the striker 1334 to pass through latch 1342 and engage with latch 1344, whereat the board 1302 will be in its secondary extended position. To move the board 1302 back to its retracted position, the user actuates the handle or other structure again to move pawls 1336, 1338 to their open positions and pushes the board back in the retracting direction. Preferably, the handle is mounted on the apparatus itself, or on the vehicle near the apparatus, so the handle can be actuated with one hand and the board can be pushed in with the other.

In another embodiment, an automatic system may be provided to lock the running board in the retracted, primary extended, and secondary extended positions. The automatic system may include a worm gear mounted on the torque transmitting member, a motor assembly associated with the worm gear and having three limit switches, and an electronic control unit. The control unit receives signals for the desired running board position and then sends outputs to the motor assembly to rotate the torque transmitting member via the worm gear to the appropriate position. The appropriate position is determined by the three limit switches that correspond to retracted, primary extended, and secondary extended positions.

While the running board assembly 1300 of the illustrated embodiment includes two links 1308, 1310 that connect the anchor 1304 with the running board 1302, the running board assembly 1300 may include more than two links to connect the anchor 1304 with the running board 1302. Further, retractable board assemblies 1300 may be provided at passenger compartment openings on one or both lateral sides of the vehicle. Also, it should be understood that the torque transmitting member 1328 may be operatively connected to a motor to move the running board 1302 between the retracted, primary extended, and secondary extended positions. Moreover, a manual driving mechanism such as those shown in FIGS. 14–17 may be operatively connected to the torque transmitting member 1328 for manually moving the running board 1302 between the retracted, primary extended, and secondary extended positions.

The foregoing illustrated embodiments are provided to illustrate the structural and functional principles of the present invention and are not intended to be limiting. To the contrary, the principles of the present invention are intended to encompass any and all changes, alterations and/or substitutions within the spirit and scope of the following claims.

What is claimed is:

1. A retractable running board assembly for use with a vehicle having a passenger compartment and a door opening for permitting a person to enter and exit the passenger compartment, the assembly comprising:

an anchor constructed and arranged to mount the running board assembly to the vehicle in an operative position beneath the door opening;

an elongated retractable running board; and a running board moving assembly comprising:

at least first and second selectively-actuated links connected to the anchor and movably supporting the running board at longitudinally spaced apart positions, the links being constructed and arranged such that, when the running board assembly is mounted in the operative position, concerted actuation of each of the selectively-actuated links moves the running board in extending and retracting directions between (a) an extended position wherein the running board is extended outwardly from the vehicle away from the door opening at an elevation lower than the door opening and spaced above ground level for facilitating entry into the passenger compartment via the door opening and (b) a retracted position wherein the running board is retracted inwardly and raised upwardly from the extended position, the extending and retracting directions having both vertical and horizontal components; and a selectively-operable driving mechanism comprising a transmission having (a) a worm gear to which a driving force is applied and (b) a worm wheel meshed with the worm gear and operatively connected to each of the first and second selectively-actuated links such that, when the running board assembly is mounted in the operative position, selective operation of the driving mechanism rotates the worm wheel to concertedly actuate each of the selectively-actuated links to move the running board between the retracted and extended positions; and wherein rotation of the worm gear by the driving force in one direction rotates the worm wheel to move the running board in the extending direction to the extended position, and in the other direction rotates the worm wheel to move the running board in the retracting direction to the retracted position;

wherein the meshing between the worm gear and the worm wheel prevents a downward force applied to the running board from rotating the worm wheel, thus limiting the running board from being moved by the downward force.

2. The retractable running board assembly according to claim 1, wherein the selectively-actuated links are constructed and arranged such that the running board moves in an arcuate path between the extended and retracted positions.

3. The retractable running board assembly according to claim 2, wherein the running board has a non-circular cross-section perpendicular to a longitudinal direction thereof and wherein the selectively actuated links enable the running board to maintain essentially the same orientation during movement between the extended and retracted positions.

4. The retractable running board assembly according to claim 3, wherein the first and second selectively-actuated links each comprise a four-bar mechanism comprising:

a first leg defined by the anchor;

a second leg connected to the first leg for pivotal movement about a longitudinal axis relative to the first leg;

a third leg pivotally connected to the first leg; and a fourth leg pivotally connected to the second and third legs, the running board being mounted to the fourth leg.

5. The retractable running board assembly according to claim 4, wherein the running board moving assembly further comprises an elongated torque transmitting member operatively connecting each of the second legs of the first and second selectively-actuated links to the worm wheel of the selectively-operable driving mechanism's transmission to transmit torque from the selectively-operable driving mechanism to pivot the second legs about the longitudinal axis, thus causing the links to move the running board between the extended and retracted positions.

6. The retractable running board assembly according to claim 1, wherein the first and second selectively-actuated links each comprise:
   a track rigidly mounted to one of the running board and the anchor; and
   a slider mounted to the other of the running board and the anchor, the slider being connected to the track for guiding relative movement of the running board between the extended and retracted positions,
   wherein actuation of the selectively-operable driving mechanism controls the relative positions between each slider and each track, thus controlling the position of the running board.

7. The retractable running board assembly according to claim 1, further comprising an elongated torque transmitting member operatively connecting each of the first and second selectively-actuated links to the worm wheel of the selectively-operable driving mechanism's transmission such that operation of the selectively-operable driving mechanism rotates the worm wheel to rotate the torque transmitting member to concertedly actuate each of the links and move the running board between the extended and retracted positions.

8. The retractable running board assembly according to claim 7, wherein the running board moving assembly further comprises a flexible torque transmitting cable operatively connected to the worm gear for transmitting the driving force to the worm gear.

9. The retractable running board assembly according to claim 1, wherein the selectively actuated links are constructed and arranged such that concerted actuation of the selectively-actuated links also moves the running board between the extended position and a secondary extended position wherein the running board is moved upwardly from the extended position for facilitating passenger access to a roof of the vehicle.

10. The retractable running board assembly of claim 1, wherein the selectively-operable driving mechanism is manually powered and has a manually operated input operatively connected to the worm gear.

11. The retractable running board assembly of claim 1, wherein the selectively-operable driving mechanism is power-operated and comprises a motor operatively connected to the worm gear.

12. The retractable running board assembly according to claim 1, wherein the vehicle includes an additional door opening and the running board assembly further comprises an additional elongated retractable running board,
   wherein the running board moving assembly further comprises third and fourth selectively-actuated links each having an end portion connected to the anchor and movably supporting the additional running board at longitudinally spaced apart positions, the third and fourth links being constructed and arranged such that, when the running board assembly is mounted in the operative position, concerted actuation of each of the third and fourth links moves the additional running board in extending and retracting directions between (a) an extended position wherein the additional running board is extended outwardly from the vehicle away form the opening at an elevation lower than the opening of the passenger compartment and spaced above ground level for facilitating passenger entry into the passenger compartment via the additional door opening and (b) a retracted position wherein the additional running board is retracted inwardly and raised upwardly from the extended position, the extending and retracting directions of the additional running board having both vertical and horizontal components and
   wherein the selectively-operable driving mechanism further comprises a second transmission having (a) a worm gear to which a driving force is applied, and (b) a worm wheel meshed with the worm gear and operatively connected to each of the third and fourth selectively-actuated links such that, when the running board assembly is mounted in the operative position, selective operation of the driving mechanism rotates the worm wheel of the second transmission to concertedly actuate each of the third and fourth selectively-actuated links to move the additional running board between the retracted and extended positions;
   wherein rotation of the second transmission's worm gear by the driving force in one direction rotates the worm wheel to move the additional running board in the extending direction to the extended position, and in the other direction rotates the worm wheel to move the additional running board in the retracting direction to the retracted position;
   wherein the meshing between the worm gear and the worm wheel of the second transmission prevents a downward force applied to the additional running board from rotating the worm wheel, thus limiting the additional running board from being moved by the downward force.

13. The retractable running board assembly according to claim 12, wherein the running board moving assembly further comprises:
   a first elongated torque transmitting member operatively connecting each of the first and second selectively-actuated links to the worm wheel of the transmission; and
   a second elongated torque transmitting member operatively connecting each of the third and fourth selectively-actuated links to the worm wheel of the second transmission,
   wherein operation of the selectively-operable driving mechanism rotates the worm wheels to rotate the first and second torque transmitting members to concertedly actuate each of the links and move the running boards between the extended and retracted positions.

14. The retractable running board assembly according to claim 13, wherein the running board moving assembly further comprises:
   first and second flexible torque transmitting cables operatively connected to each of the worm gears for transmitting driving force to the worm gears.

15. A method of operating a retractable running board assembly on a vehicle, the vehicle comprising a passenger compartment having a door opening for permitting a person to enter and exit the passenger compartment, the retractable running board assembly being mounted to the vehicle in an operative position beneath the door opening, the retractable running board assembly comprising an elongated retractable running board, first and second selectively-actuated links connected to the anchor and movably supporting the running board at longitudinally spaced apart positions, the links being constructed and arranged such that concerted actuation of each of the links moves the running board between (a) an extended position wherein the running board is extended outwardly from the vehicle away from the door opening at an elevation lower than the opening of the passenger compartment and spaced above ground level for facilitating entry into the passenger compartment via the door opening, and (b) a retracted position wherein the running board is retracted inwardly and raised upwardly from the extended position, the extending and retracting directions having both vertical and horizontal components, and a selectively-operable driving mechanism comprising a transmission having (a) worm gear to which driving force is applied and (b) as worm wheel meshed with the worm gear and operatively connected to each of the first and second selectively-actuated links such that the actuation of the driving mechanism rotates the worm wheel to concertedly actuate each of the selectively-actuated links, the method comprising:

selectively operating the driving mechanism to rotate the worm wheel to concertedly actuate the first and second selectively-actuated links, and thereby move the running board both vertically and horizontally between the extended position and the retracted position;

wherein the meshing between the worm gear and the worm wheel prevents a downward force applied to the running board from rotating the worm wheel, thus limiting the running board from being moved by the downward force.

16. A retractable running board assembly for use with a vehicle having a passenger compartment and a door opening for permitting a person to enter and exit the passenger compartment, the assembly comprising:

an anchor constructed and arranged to mount the running board assembly to the vehicle in an operative position beneath the door opening;

an elongated retractable running board having a non-circular cross-section perpendicular to a longitudinal direction thereof; and a running board moving assembly comprising:

at least one link connected between the running board and the anchor and movably supporting the running board, the link being constructed and arranged such that, when the running board assembly is mounted to the vehicle in the operative position, actuation of the link moves the running board in an arcuate path in extending and retracting directions between (a) an extended position wherein the running board is extended outwardly from the vehicle away from the door opening at an elevation lower than the door opening and spaced above ground level for facilitating entry into the passenger compartment via the door opening and (b) a retracted position wherein the running board is retracted inwardly and raised upwardly from the extended position, the extending and retracting directions having both vertical and horizontal components, the link enabling the running board to maintain essentially the same orientation during movement between the extended and retracted positions; and a selectively-operable driving mechanism comprising a transmission having (a) a worm gear to which driving force is applied, and (b) a worm wheel meshed with the worm gear and operatively connected to the link such that, when the running board assembly is mounted in the operative position, selective operation of the driving mechanism rotates the worm wheel to actuate the link to move the running board between the retracted and extended positions;

wherein rotation of the worm gear by the driving force in one direction rotates the worm wheel to move the running board in the extending direction to the extended position, and in the other direction rotates the worm wheel to move the running board in the retracting direction to the retracted position;

wherein the meshing between the worm gear and the worm wheel prevents a downward force applied to the running board from rotating the worm wheel, thus limiting the running board from being moved by the downward force.

17. The retractable running board assembly according to claim 16, wherein at least one selectively-actuated link includes at least first and second selectively-actuated links movably supporting the running board at longitudinally spaced apart positions.

18. The retractable running board assembly according to claim 16, wherein the first and second selectively-actuated links each comprise a four-bar mechanism comprising:

a first leg defined by the anchor;

a second leg connected to the first leg for pivotal movement about a longitudinal axis relative to the first leg;

a third leg pivotally connected to the first leg; and a fourth leg pivotally connected to the second and third legs, the running board being mounted to the fourth leg.

19. The retractable running board assembly to claim 17, wherein the worm wheel of the selectively-operable driving mechanism's transmission is operatively connected to each of the first and second selectively-actuated links such that, when the running board assembly is mounted in the operative position, selective operation of the driving mechanism rotates the worm wheel to concertedly actuate each of the selectively actuated links to move the running board between the retracted and extended positions.

20. The retractable running board assembly according to claim 18, wherein the running board moving assembly further comprises an elongated torque transmitting member operatively connecting each of the second legs of the first and second selectively-actuated links to the worm wheel of the selectively-operable driving mechanism's transmission to transmit torque from the selectively-operable driving mechanism to pivot the second legs about the longitudinal axis, thus causing the links to move the running board between the extended and retracted positions.

21. The retractable running board assembly according to claim 16, wherein the at least one selectively-actuated link is constructed and arranged such that, when the running board assembly is mounted to the vehicle in the operative position, actuation of the link moves the running board between (a) the retracted position, (b) the extended position, and (c) a secondary extended position wherein the running board is moved upwardly from the primary extended position for facilitating passenger access to a roof of the vehicle.

22. The retractable running board assembly according to claim 16, wherein the vehicle includes an additional door opening and the running board assembly further comprises an additional elongated retractable running board having a non-circular cross-section perpendicular to a longitudinal direction thereof;

wherein the running board moving assembly further comprises at least one additional selectively-actuated link connected between the additional running board and the anchor and movably supporting the additional running board, the link being constructed and arranged such that, when the running board assembly is mounted to the vehicle in the operative position, actuation of the additional link moves the additional running board in extending and retracting directions between (a) a retracted position, (b) an extended position wherein the running board is moved at least outwardly with respect to the vehicle from the retracted position for facilitating passenger entry into the passenger compartment via the additional door opening, the extending and retracting directions of the additional running board having both vertical and horizontal components, the additional link enabling the additional running board to maintain essentially the same orientation during movement between the extended and retracted position; and wherein the selectively-operable driving mechanism further comprises a second transmission having (a) a worm gear to which a driving force is applied, and (b) a worm wheel meshed with the worm gear and operatively connected to the additional link such that, when the running board assembly is mounted in the operative position, selective operation of the driving mechanism actuates the additional link to move additional running board between the retracted and extended positions;

wherein rotation of the second transmission's worm gear by the driving force in one direction rotates the worm wheel to move the additional running board in the extending direction to the extended position, and in the other direction rotates the worm wheel to move the additional running board in the retracting direction to the retracted position;

wherein the meshing between the worm gear and the worm wheel of the second transmission prevents a downward force applied to the additional running board from rotating the worm wheel, thus limiting the additional running board from being moved by the downward force.

23. The retractable running board assembly according to claim 22 wherein the at least one link includes first and second selectively-actuated links connected to the anchor and movably supporting the running board at longitudinally spaced positions and the at least one additional link includes third and fourth selectively-actuate links connected to the anchor and movably supporting the additional running board at longitudinally spaced apart positions.

24. The retractable running board assembly according to claim 22, wherein the running board moving assembly further comprises:

a first elongated torque transmitting member operatively connecting each of the first and second selectively-actuated links to the worm wheel of the transmission; and a second elongated torque transmitting member operatively connecting each of the third and fourth selectively-actuated links to the worm wheel of the transmission, wherein operation of the selectively-operable driving mechanism rotates worm wheels to rotate the first and second torque transmitting members to concertedly actuate each of the links and move the running boards between the respective extended and retracted positions.

25. The retractable running board assembly according to claim 23, wherein the running board moving assembly further comprises:

first and second flexible torque transmitting cables operatively connected to each of the worm gears for transmitting driving force to the worm gears.

26. A method of operating a retractable running board assembly on a vehicle, the vehicle having a passenger compartment and a door opening for permitting a person to enter and exit the passenger compartment, the running board assembly being mounted to the vehicle in an operative position beneath the door opening, the running board assembly comprising an elongated retractable running board having a non-circular cross-section perpendicular to a longitudinal direction thereof, at least one link connected between the running board and the anchor and movably supporting the running board, the link being constructed and arranged such that actuation of the link moves the running board in an arcuate path in extending and retracting directions between (a) an extended position wherein the running board extends outwardly from the vehicle away from the door opening at an elevation lower than the door opening and spaced above ground level for facilitating entry into the passenger compartment via the door opening and (b) a retracted position wherein the running board is retracted inwardly and raised upwardly from the extended position, the extending and retracting directions having both vertical and horizontal components, the link enabling the running board to maintain essentially the same orientation during movement between the extended and retracted positions, and a selectively-operable driving mechanism comprising a transmission having (a) a worm gear to which a driving force is applied and (b) a worm wheel meshed with the worm gear and operatively connected to the link such that selective operation of the driving mechanism rotates the worm wheel to actuate the link to move the running board between the retracted and extended positions, the method comprising:

selectively operating the driving mechanism to rotate the worm wheel to actuate the link and thereby move the running board in the arcuate path between the extended and retracted position;

wherein the meshing between the worm gear and the worm wheel prevents a downward force applied to the running board from rotating the worm wheel, thus limiting the running board from being moved by the downward force.

* * * * *